(12) United States Patent
Moon et al.

(10) Patent No.: US 9,185,728 B2
(45) Date of Patent: Nov. 10, 2015

(54) METHOD FOR SETTING UP CARRIER IN CARRIER AGGREGATION SYSTEM AND APPARATUS REQUIRED FOR SAME

(75) Inventors: Sung Ho Moon, Anyang-si (KR); So Yeon Kim, Anyang-si (KR); Han Gyu Cho, Anyang-si (KR); Jae Hoon Chung, Anyang-si (KR); Seung Hee Han, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1148 days.

(21) Appl. No.: 13/145,104

(22) PCT Filed: Jan. 19, 2010

(86) PCT No.: PCT/KR2010/000343
§ 371 (c)(1),
(2), (4) Date: Sep. 27, 2011

(87) PCT Pub. No.: WO2010/082805
PCT Pub. Date: Jul. 22, 2010

(65) Prior Publication Data
US 2012/0033647 A1    Feb. 9, 2012

Related U.S. Application Data

(60) Provisional application No. 61/183,559, filed on Jun. 3, 2009, provisional application No. 61/183,897, filed on Jun. 3, 2009, provisional application No. 61/146,303, filed on Jan. 21, 2009, provisional application No. 61/145,732, filed on Jan. 19, 2009.

(51) Int. Cl.
*H04J 3/00* (2006.01)
*H04W 74/00* (2009.01)
(Continued)

(52) U.S. Cl.
CPC .............. *H04W 74/006* (2013.01); *H04L 5/001* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

2006/0039318 A1   2/2006 Oh et al.
2007/0171889 A1   7/2007 Kwon et al.
(Continued)

FOREIGN PATENT DOCUMENTS

KR   1020080064996       7/2008
WO   WO2007052115    *  5/2007

OTHER PUBLICATIONS

3GPP TSG RAN WG1 Meeting #55, Non-backward compatible componen carriers for asymmetric carrier aggregation, Nov. 10-14, 2008.*

*Primary Examiner* — Jae Y Lee
*Assistant Examiner* — Aixa A Guadalupe
(74) *Attorney, Agent, or Firm* — Lee, Hong, Degerman, Kang & Waimey

(57) ABSTRACT

The present invention relates to a wireless communication system. Specifically, the invention relates to a method for configuring a component carrier at a base station in a wireless communication system, comprising the steps of determining whether initial access is permitted to a user equipment with respect to a downlink component carrier; and transmitting a synchronization channel signal and a broadcast channel signal to at least one user equipment via the downlink component carrier, wherein the initial access permission is applied to said at least one user equipment by modifying at least one of the synchronization channel signal and the broadcast channel signal.

7 Claims, 17 Drawing Sheets

(a)

(b)

(c)

(51) Int. Cl.
*H04L 5/00* (2006.01)
*H04L 23/02* (2006.01)
*H04L 25/03* (2006.01)
*H04L 27/26* (2006.01)

(52) U.S. Cl.
CPC .............. *H04L 5/0098* (2013.01); *H04L 23/02* (2013.01); *H04L 25/03866* (2013.01); *H04L 27/2613* (2013.01)

(56) References Cited

U.S. PATENT DOCUMENTS

| | | | |
|---|---|---|---|
| 2008/0205375 A1* | 8/2008 | Onggosanusi et al. | 370/350 |
| 2009/0147865 A1* | 6/2009 | Zhang et al. | 375/259 |
| 2010/0227569 A1* | 9/2010 | Bala et al. | 455/73 |

* cited by examiner

FIG. 2
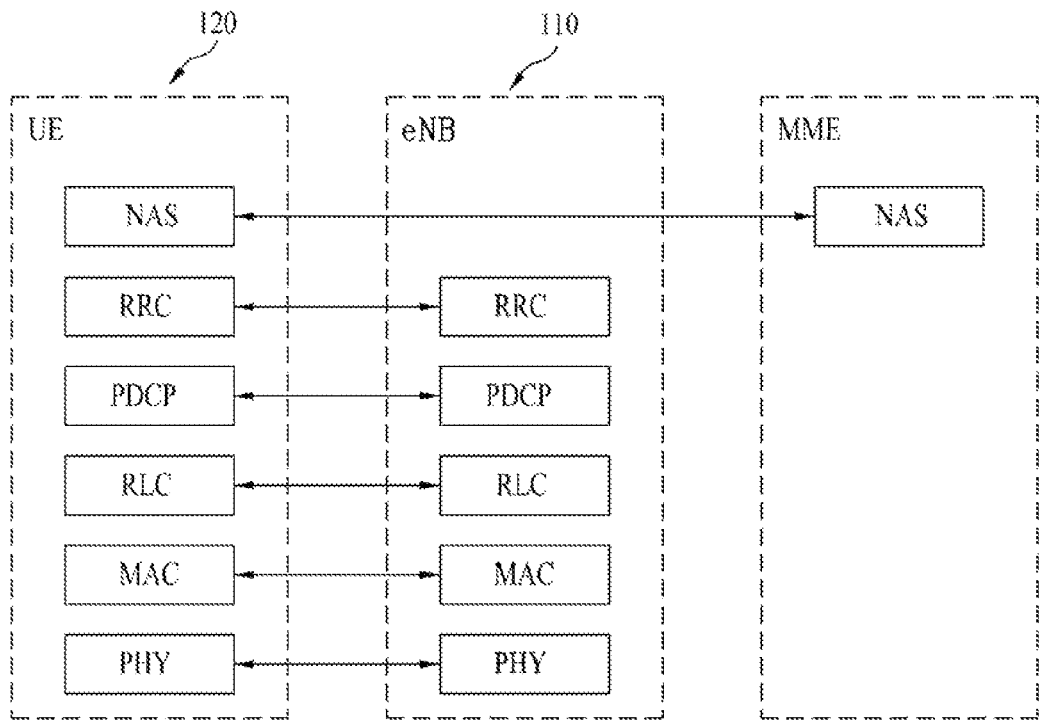
(a) control-plane protocol stack
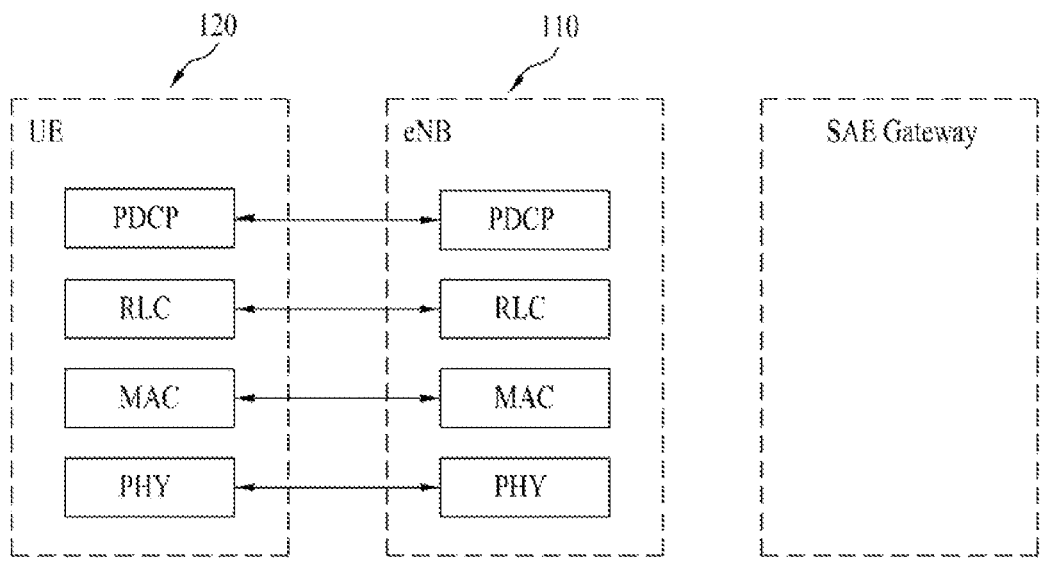
(b) user-plane protocol stack FIG. 13
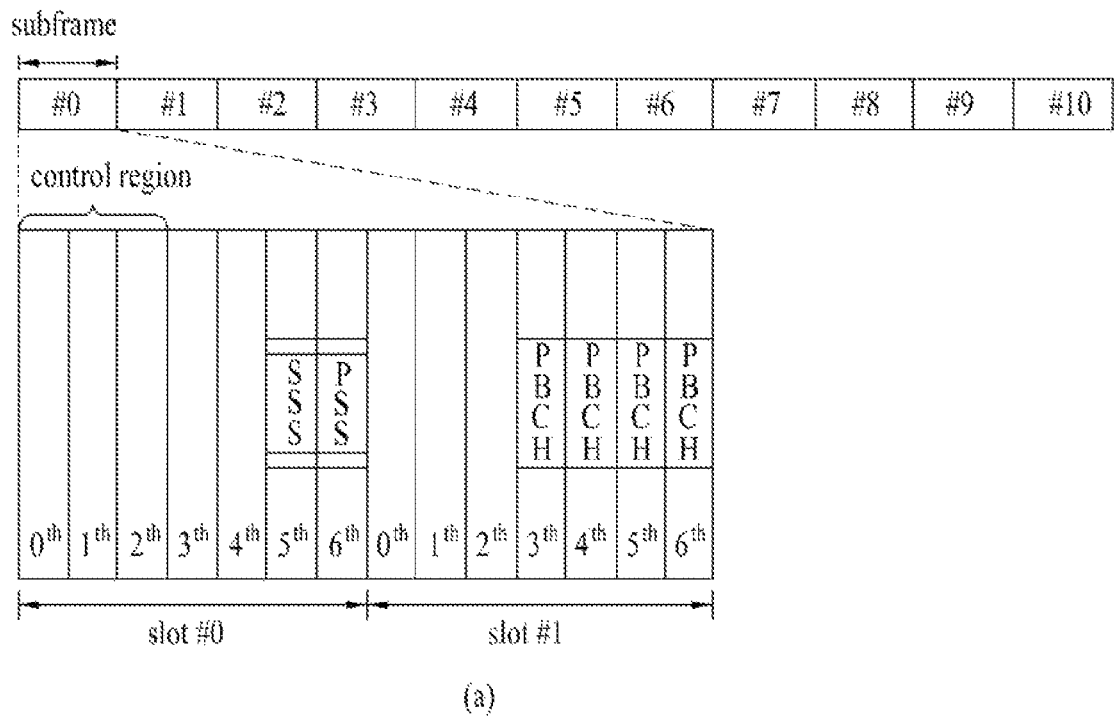
(a)
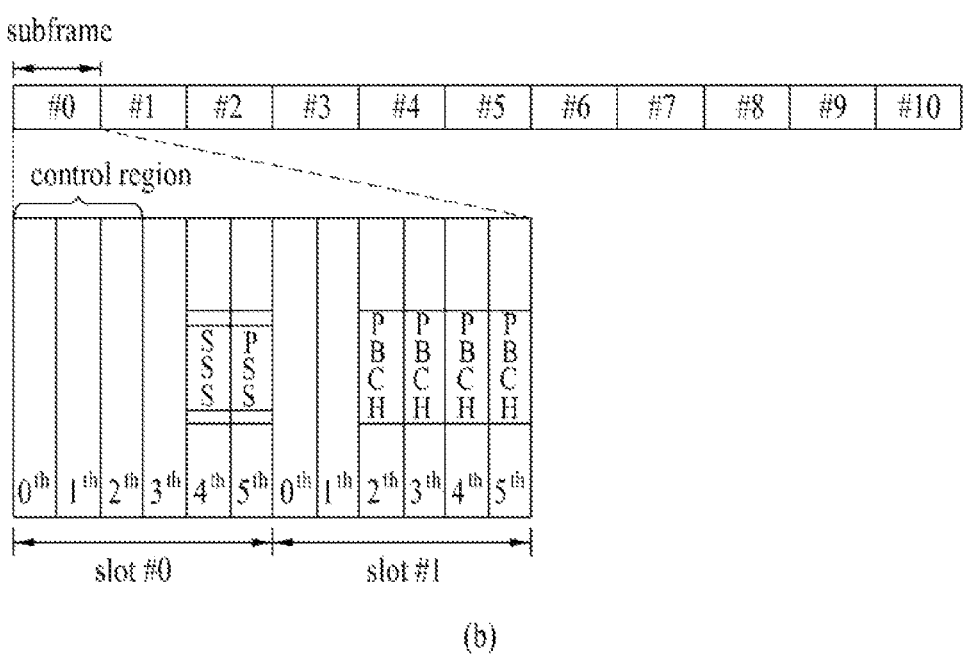
(b)

FIG. 14
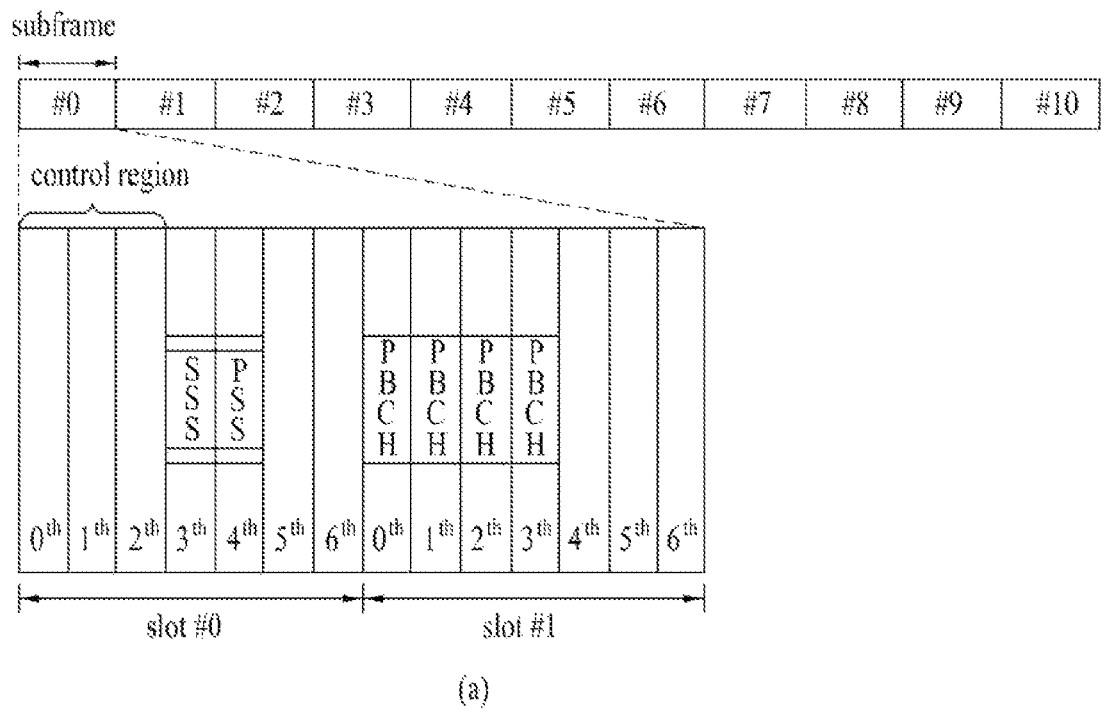
(a)
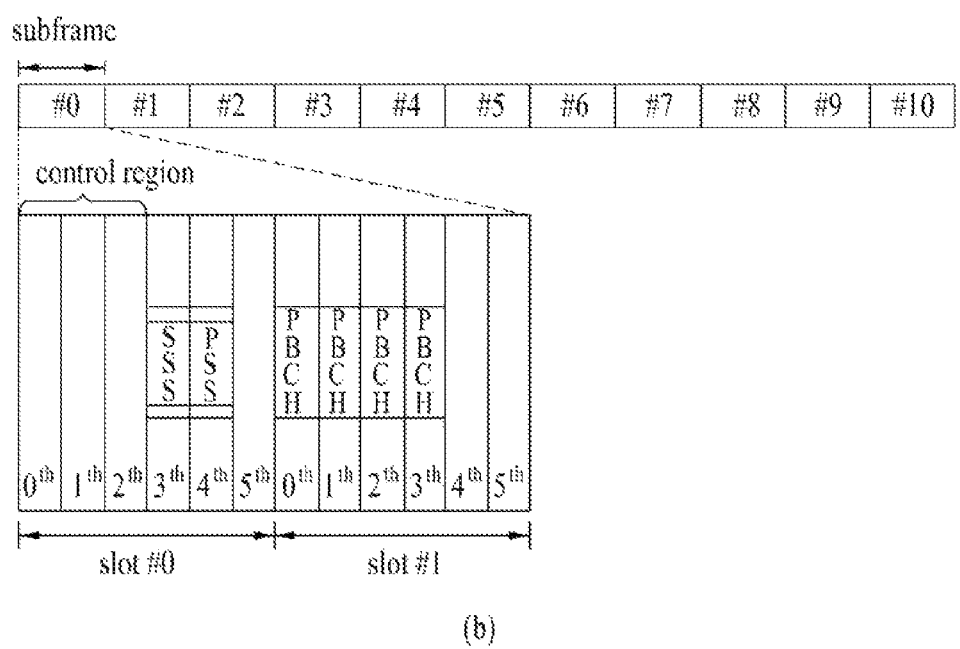
(b)

FIG. 15
(a)
(b)
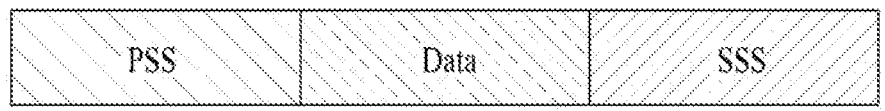
(c)
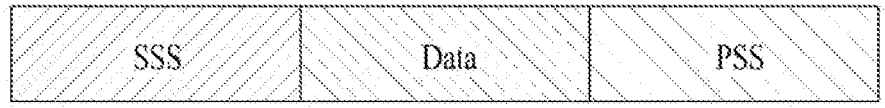

METHOD FOR SETTING UP CARRIER IN CARRIER AGGREGATION SYSTEM AND APPARATUS REQUIRED FOR SAME

CROSS-REFERENCE TO RELATED APPLICATIONS

This application is the application National Stage filing under 35 U.S.C. 371 of International Application No. PCT/KR2010/000343, filed on Jan. 19, 2010, which claims to the benefit of U.S. Provisional Application Nos. 61/183,559, filed on Jun. 3, 2009, 61/183,897, filed on Jun. 3, 2009, 61/146,303, filed on Jan. 21, 2009, and 61/145,732, filed on Jan. 19, 2009, the contents of which are hereby incorporated by reference herein in their entirety.

TECHNICAL FIELD

The present invention relates to a wireless communication system, and more particularly, to a method for setting up carrier in a carrier aggregation system and an apparatus required for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE

Technical Problem

An object of the present invention devised to solve the conventional problem is to provide a method for setting up component carrier in a wireless communication system that supports carrier aggregation and an apparatus required for the same.

Other object of the present invention is to provide a method for setting up component carrier by considering a type of a terminal and an apparatus required for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, in method for configuring a component carrier at a base station in a wireless communication system supporting carrier aggregation, the method comprises the steps of determining whether initial access is permitted to a user equipment with respect to a downlink component carrier; and transmitting a synchronization channel signal and a broadcast channel signal to at least one user equipment via the downlink component carrier, wherein the initial access permission is applied to said at least one user equipment by modifying at least one of the synchronization channel signal and the broadcast channel signal.

In another aspect of the present invention, a base station configured to perform a method for configuring a component carrier applied to at least one user equipment comprises a radio frequency (RF) unit configured to transmit and receive a radio signal to and from the user equipment; a memory for storing information transmitted to and received from the user equipment and a parameter required for an operation of the base station; and a processor connected with the RF unit and the memory and configured to control the RF unit and the memory for the operation of the base station, wherein the processor determines whether initial access is permitted to the user equipment with respect to a downlink component carrier, and transmits a synchronization channel signal and a broadcast channel signal to at least one user equipment via the downlink component carrier, wherein the initial access permission is applied to the user equipment by modifying at least one of the synchronization channel signal and the broadcast channel signal.

In this case, the initial access permission is determined considering a type of the user equipment. Also, the initial access permission is applied by modifying at least one of radio resources allocated to the synchronization channel signal and the broadcast channel signal. Also, the initial access permission is applied by exchanging a time order a primary synchronization channel (P-SCH) signal and a time order of a secondary synchronization channel (S-SCH) signal with each other. Also, the initial access permission is applied by scrambling segment 1 on the basis of segment 2 in the secondary synchronization channel signal into which the segment 1 and the segment 2 are mapped. Also, the initial access permission is applied by modifying a phase of a signal transmitted through the synchronization channel. Also, the initial access permission is applied by modifying a location in a time domain of the broadcast. channel signal. Also, the initial access permission is applied by varying scrambling applied to a message of the broadcast channel signal. Also, the initial access permission is applied by varying a CRC mask applied to cyclic redundancy check (CRC) of the broadcast channel signal.

In other aspect of the present invention, in a method for configuring a component carrier by at a base station in a wireless communication system supporting carrier aggregation, the method comprises the steps of determining whether initial access is permitted to a user equipment with respect to a downlink component carrier; and transmitting a synchronization channel signal and a broadcast channel signal to at least one user equipment via the downlink component carrier, wherein the initial access permission is indicated by using information included in RRC message transmitted through the broadcast channel.

In this case, the initial access permission is indicated by using a field value set up in master block information. Also, the initial access permission is indicated by using a list of component carriers to which initial access is restricted.

Advantageous Effects

The method for setting up carrier in a wireless communication system and the apparatus required for the same according to the present invention have several benefits.

Firstly, component carrier can efficiently be set up in the wireless communication system that supports frequency aggregation. Also, component carrier can efficiently be set up by considering a type of a user equipment.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating a structure of a radio interface protocol between a user equipment and E-UTRAN based on the 3GPP radio access network standard;

FIG. 13 is a diagram illustrating an example of a method for setting up non-backward compatible CC using a location of a PBCH;

FIG. 14 is a diagram illustrating an example of a method for setting up non-backward compatible CC using a location of a synchronization channel (SCH);

FIG. 15 is a diagram illustrating an example of terminal access restricted by time relation between PSS and SSS;

BEST MODE FOR CARRYING OUT THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
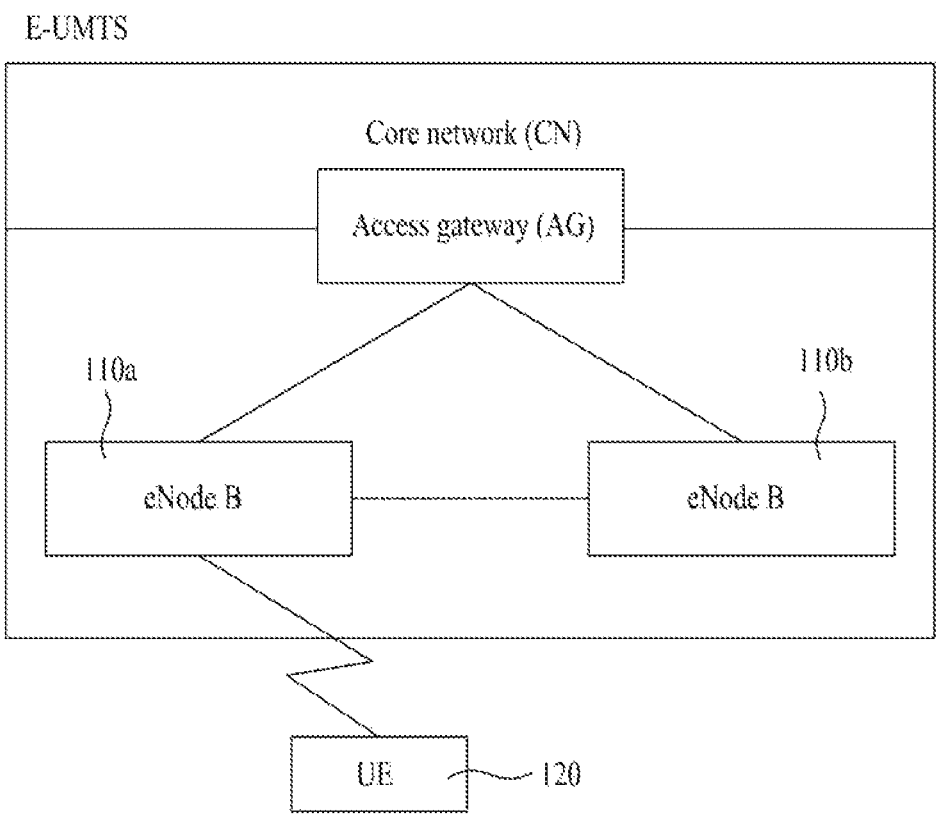
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. A Core Network (CN) may include the AG and a network node for user registration of the UE. The AG manages mobility of a UE on a Tracking Area (TA) basis, wherein one TA includes a plurality of cells.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical (PHY) layer as the first layer provides an information transfer service to an upper layer using a physical channel. The physical layer is connected to a medium access control (MAC) layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Meanwhile, as uplink transport channels carrying data from the user equipment to the network, there are provided a random access channel (RACH) carrying an initial control message and an uplink shared channel (UL-SCH) carrying user traffic or control message.

Figure 3:
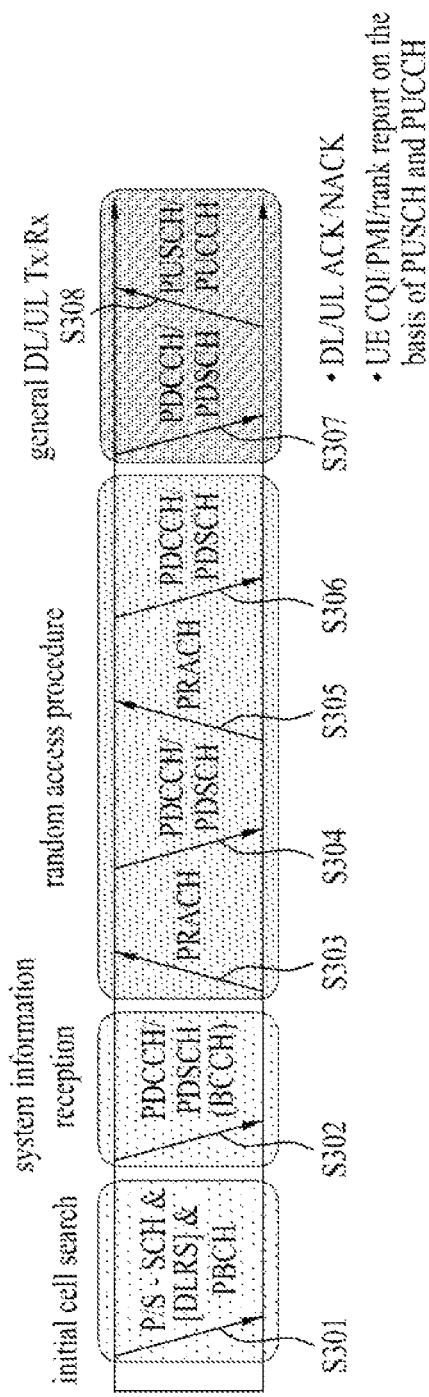
FIG. 3 is a diagram illustrating physical channels used in an LTE system and a method for transmitting a signal using the physical channels.

FIG. 3 is a diagram illustrating physical channels used in a 3GPP system and a method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) signal and a secondary synchronization channel (S-SCH) signal from the base station, and acquires information of cell ID, etc. Afterwards, the user equipment can acquire broadcast information within the cell by receiving a physical broadcast channel (PBCH) signal from the base station.

The user equipment which has finished the initial cell search can acquire more detailed system information by receiving a physical downlink shared channel (PDSCH) signal in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a physical random access channel (PRACH) (S303 and S305), and receives a response message to the preamble through the PDCCH and the PDSCH corresponding to the PDCCH (S304 and S306). In case of a contention based RACH, a contention resolution procedure can be performed additionally.

The user equipment which has performed the aforementioned steps receives the PDCCH/PDSCH signals (S307) and transmits a physical uplink shared channel (PUSCH) signal and a physical uplink control channel (PUCCH) signal (S308), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment transmits the aforementioned control information such as CQI/PMI/RI through the PUSCH and/or the PUCCH.

Figure 4:
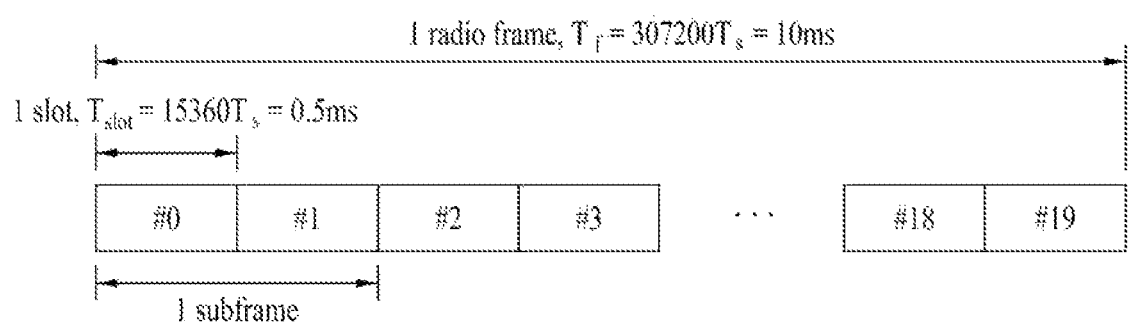
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \cdot T_s$) and includes ten (10) subframes of an equal size. Each sub frame has a length of 1 ms and includes two slots. Each slot has a length of 0.5 ms ($15360 \cdot T_s$). In this case, $T_s$ represents a sampling time, and is expressed by $\cdot T_s=1/(15 \text{ kHz} \times 2048)=3.2552 \times 10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
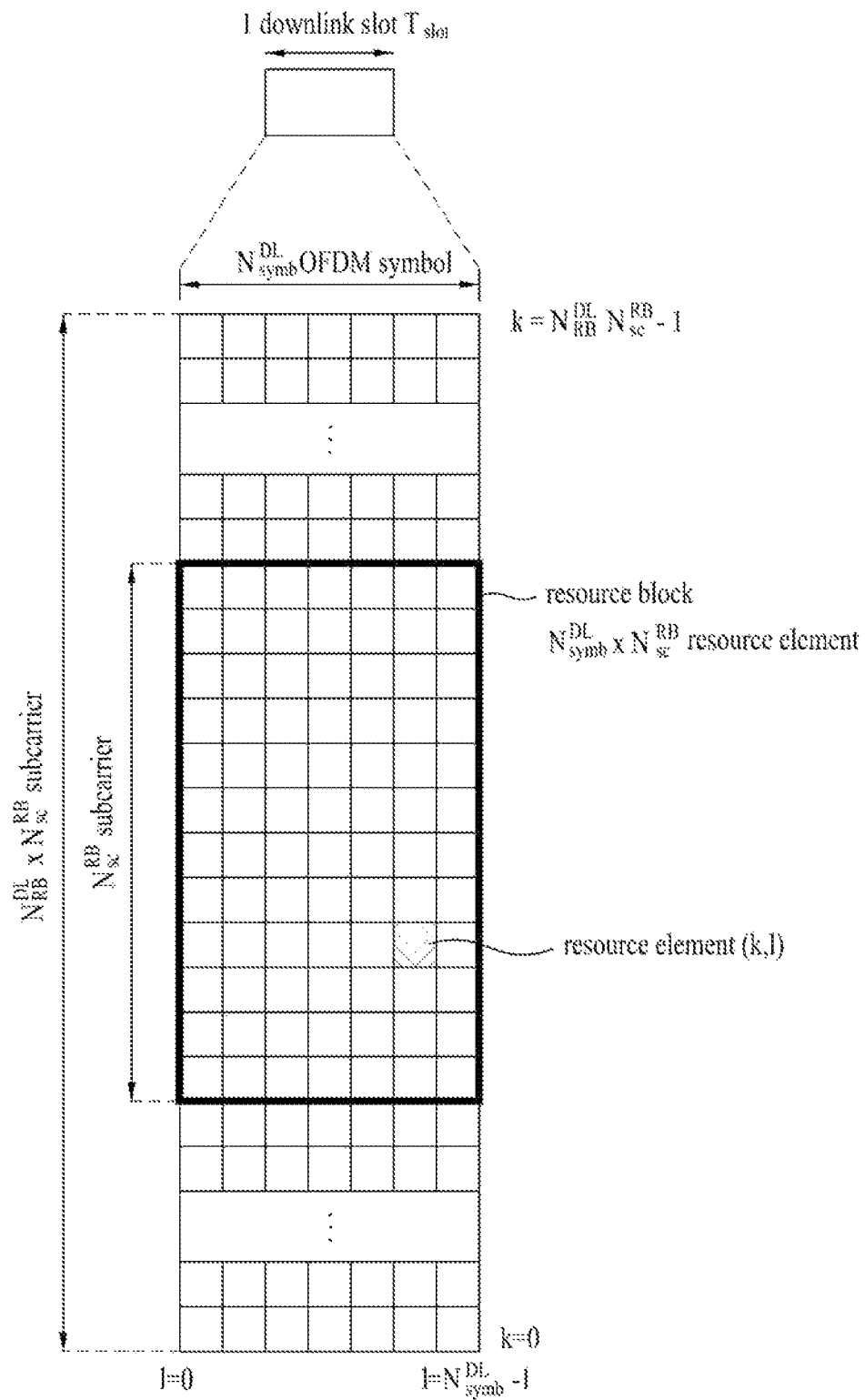
FIG. 5 is a diagram illustrating a resource grid of a downlink slot.

FIG. 5 is a diagram illustrating a resource grid of a downlink slot.

Referring to FIG. 5, the downlink slot includes a plurality of OFDM symbols in a time region and a plurality of resource blocks in a frequency region. Although an example of FIG. 5 illustrates that the downlink slot includes seven OFDM symbols and the resource block includes twelve subcarriers, the present invention is not limited to the example of FIG. 5. For example, the number of OFDM symbols included in the downlink slot can be varied depending on a length of cyclic prefix (CP). Each element on the resource grid will be referred to as a resource element. One resource block includes 12×7 resource elements. The number $N^{DL}$ of resource blocks included in the downlink slot is subjected to a downlink transmission bandwidth established in a cell.

A physical broadcast channel (PBCH) and a synchronization channel (SCH) of the LTE system will be described in more detail with reference to FIG. 6 to FIG. 10. The SCH includes a P-SCH and an S-SCH. A primary synchronization signal (PSS) is transmitted on the P-SCH, and a secondary synchronization signal (SSS) is transmitted on the S-SCH.

Figure 6:
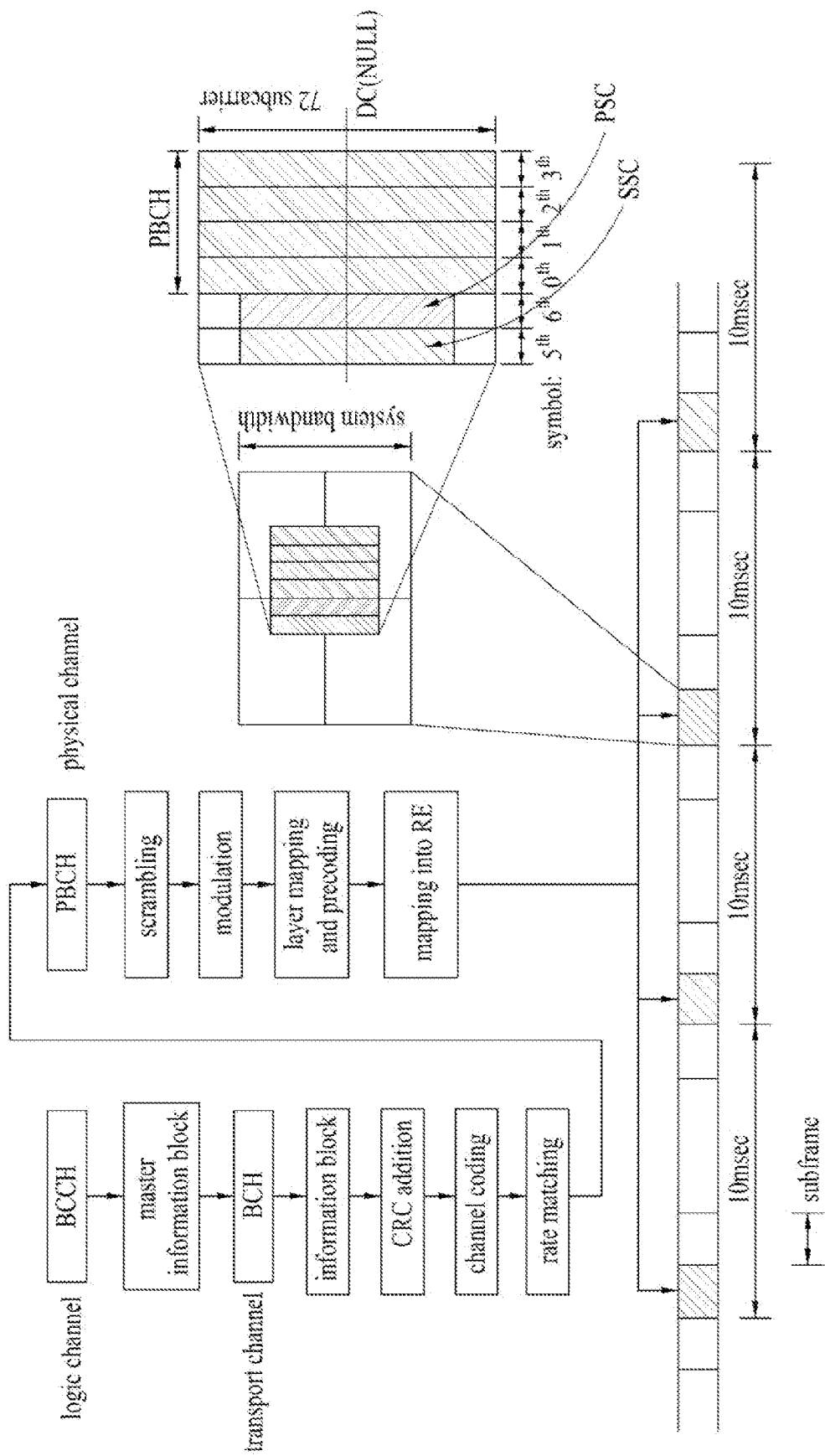
FIG. 6 to FIG. 10 are diagrams illustrating a physical broadcast channel (PBCH) and a synchronization channel (SCH) of an LTE system.

Referring to FIG. 6, a message of the PBCH is expressed by a master information block of the RRC layer. Specifically, the message of the PBCH will be illustrated in Table 1.

TABLE 1

-- ASN1START
MasterInformationBlock ::= SEQUENCE {
   dl-Bandwidth       ENUMERATED
                      {n6,n15,n25,n50,n75,n100,spare2,spare1}, TABLE 1-continued

| | |
|---|---|
| phich-Configuration | PHICH-Configuration, |
| systemFrameNumber | BIT STRING (SIZE (8)), |
| spare | BIT STRING (SIZE (10)) |
| } | |
| -- ASN1STOP | |

As illustrated in Table 1, the PBCH signal includes a downlink system bandwidth (DL BW), PHICH setup, and a system frame number (SFN). Also, 10 bits (spare) remain in the PBCH as reserved fields. Accordingly, the LTE user equipment can explicitly identify information on DL BW, SFN, and PHICH setup by receiving the PBCH signal. Meanwhile, the user equipment can implicitly identify information, such as the number of transmitting antennas of the base station (# of transmit antenna ports at eNB), by receiving the PBCH signal. The information on the number of transmitting antennas of the base station is implicitly signaled by masking (for example, XOR operation) of sequences corresponding to the number of transmitting antennas through 16-bit cyclic redundancy check (CRC) used for error detection of the PBCH signal. Masking sequences per the number of antennas used in the LTE system are illustrated in Table 2.

TABLE 2

| Number of transmit antenna ports at eNode-B | PBCH CRC mask <$x_{ant,0}, x_{ant,1}, \ldots, x_{ant,15}$> |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is mapped into a physical resource after cell-specific scrambling, modulation, layer mapping and precoding. In The LTE system, the PBCH uses quadrature phase shift keying (QPSK) only as a modulation scheme. The PBCH is mapped into resource elements (k, l) indicated by Equation 1 below.

$$k = \frac{N_{RB}^{DL} N_{sc}^{RB}}{2} - 36 + k', k' = 0, 1, \ldots, 71 \quad \text{[Equation 1]}$$
$$l = 0, 1, \ldots, 3$$

In this case, l is an OFDM symbol index of the slot 1 of the $0^{th}$ subframe, and k is a subcarrier index. The Equation 1 is a mapping example based on one radio frame. The coded PBCH is mapped into four subframes for 40 ms as illustrated in FIG. 6. Timing of 40 ms corresponds to blind detection, and explicit signaling in respect of timing of 40 ms does not exist separately. As will be aware of it from the Equation 1 and FIG. 6, the PBCH is mapped into four OFDM symbols and 72 subcarriers within one subframe. The PBCH is not mapped into the resource element (RE) where a reference signal (RS) for 4 Tx antennas is located, regardless of the number of actual transmitting antennas.

Figure 7:
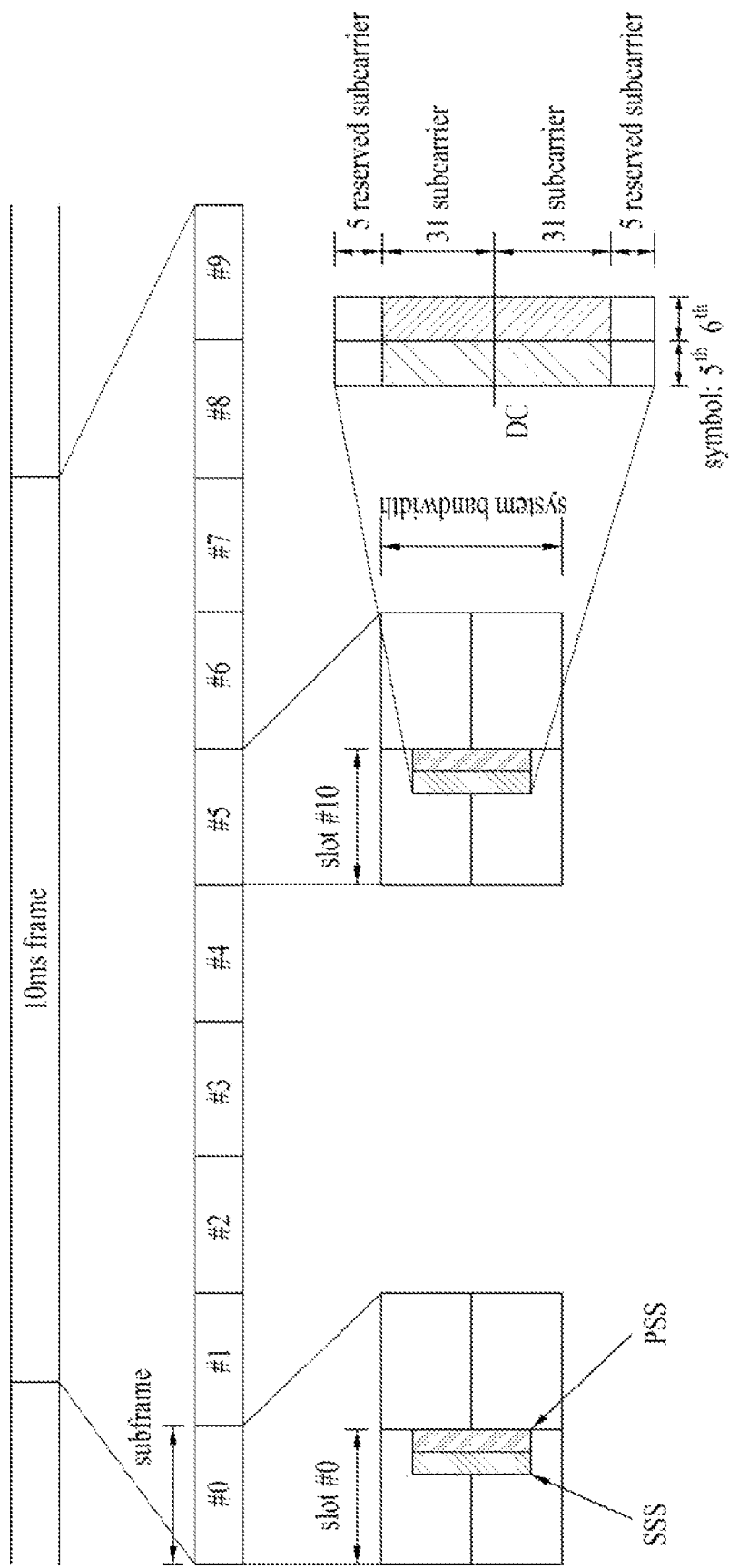

Referring to FIG. 7, the P-SCH is located at the last OFDM symbol of the $0^{th}$ slot and the $10^{th}$ slot. The P-SCH signal is transmitted using 72 subcarriers (10 subcarriers are reserved, and 62 subcarriers are used for PSS transmission) within the corresponding OFDM symbol. The same PSS (primary synchronization signal) is transmitted through two P-SCHs. A code used for the PSS may be referred to as a primary synchronization code (PSC). The P-SCH is used to obtain time domain synchronization and/or frequency domain synchronization such as OFDM symbol synchronization and slot synchronization. A Zadoff-Chu (ZC) sequence can be used as the PSS, and at least one PSS exists in the wireless communication system.

The ZC sequence is one of a constant amplitude zero auto-correlation (CAZAC) sequence which is an orthogonal sequence. Supposing that $N_{ZC}$ is a length of the CAZAC sequence of a positive integer and root index u is relatively prime to $N_{ZC}$ (u is a natural number less than $N_{ZC}$ and is relatively prime to $N_{ZC}$), the kth element of the uth CAZAC sequence can be expressed by the following Equation 2 (k=0, 1, \ldots, $N_{ZC}-1$).

$$d^u(k) = \exp\left\{-j\frac{\pi u k(k+1)}{N_{ZC}}\right\} \quad \text{[Equation 2]}$$

when $N_{ZC}$ is odd number $$d^u(k) = \exp\left\{-j\frac{\pi u k^2}{N_{ZC}}\right\} \text{ when } N_{ZC} \text{ is even number}$$

The CAZAC sequence d(k) has three features as follows.

$$|d(k)|=1 \text{ for all } k, N_{ZC}, u \quad \text{[Equation 3]}$$

$$R_{u;N_{ZC}}(m) = \begin{cases} 1, & \text{for } m = 0 \\ 0, & \text{for } m \neq 0 \end{cases} \quad \text{[Equation 4]}$$

$$R_{u_1;u_2;N_{ZC}}(m) = \text{const for all } u_1, u_2$$

The Equation 3 means that the CAZAC sequence always has a size of 1. The Equation 4 means that auto correlation of the CAZAC sequence is expressed by a Dirac-delta function, wherein the auto correlation is based on circular correlation. The Equation 5 means that cross correlation is always a constant.

The P-SCH of the LTE system is defined by a ZC sequence of 62 length based on Equation 6 below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 6]}$$

In this case, the root index u of the ZC sequence is given as expressed by Table 3 below.

TABLE 3

| $N_{ID}^{(2)}$ | Root index u |
|---|---|
| 0 | 25 |
| 1 | 29 |
| 2 | 34 |

Figure 8:
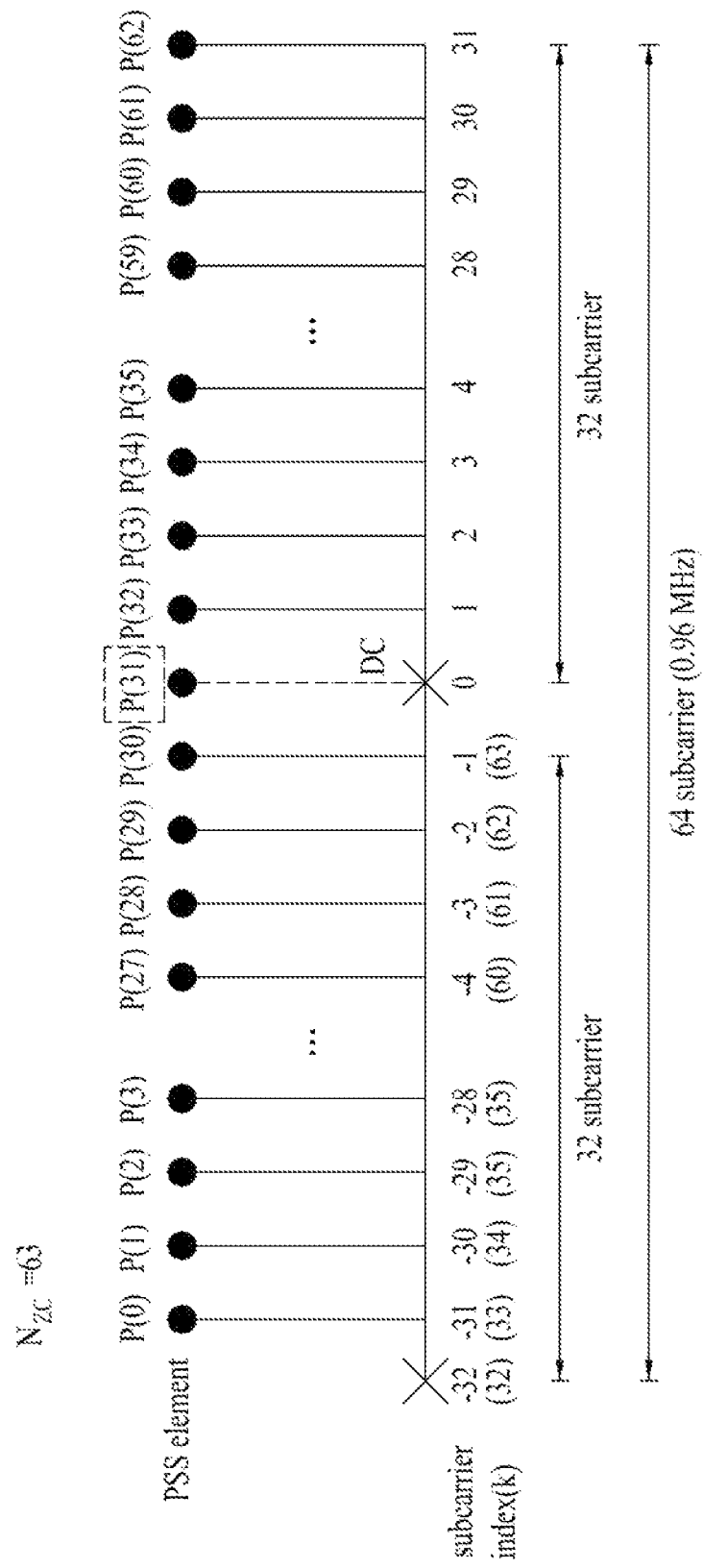

FIG. 8 illustrates an example of sequence mapping into P-SCH. It is assumed that a Fast Fourier Transform (FFT) window size is 64 (Nf=64). Referring to FIG. 8, a ZC sequence of a length ($N_{ZC}$) of 63 is mapped into 64 subcarriers including DC subcarrier. The ZC sequence is mapped into the subcarriers, sequentially, by starting from the leftmost subcarrier, whereby the $31^{st}$ element P 31 of the ZC sequence is mapped into the DC subcarrier. A null value is inserted to a subcarrier (the $32^{nd}$ subcarrier) into which a sequence is not mapped for a mapping interval. The sequence P 31 mapped into the DC subcarrier is punctured. In this case, if the left side means one side of the DC subcarrier, the opposite site of the DC subcarrier becomes the right side. However, it is to be understood that the location of the DC subcarrier is not limited to the location illustrated in FIG. 8. Various modifications can be made in the size of the FFT window of the P-SCH and the length of the ZC sequence. In this respect, various modifications can be made in the sequence mapping scheme. The ZC sequence may be mapped symmetrically based on the DC subcarrier in the time domain.

The S-SCH is located at the OFDM symbol just before the last OFDM symbol of the $0^{th}$ slot and the $10^{th}$ slot. The S-SCH and the P-SCH are located at neighboring OFDM symbols. The S-SCH signal is transmitted using 72 subcarriers (10 subcarriers are reserved, and 62 subcarriers are used for SSS transmission) within the corresponding OFDM symbols. Different secondary synchronization signals (SSSs) are transmitted through two S-SCHs. The S-SCH is used to obtain frame synchronization, cell group ID and/or CP configuration of a cell (that is, use information of general CP or extended CP). Since two SSSs are used for one S-SCH, final information is transmitted by combination of two short codes: A code used for the SSS may be referred to as a secondary synchronization code (SSC). For example, a total of 31 codes used for SSS can be generated by a circular shift of 31-length m-sequence generated from a polynomial of $x^5+x^2+1$. Accordingly, two m-sequences of a 31-length can be mapped into one S-SCH.

The m-sequence is one of a pseudo noise (PN) sequence. The PN sequence can be reproduced and has similar features to those of a random sequence. The PN sequence has features as follows. (1) The PN sequence has a repetition period of a sufficient length, whereas the random sequence has a repetition period of an infinite length. (2) The number of 0 included in one period is similar to the number of 1 included in one period. (3) A run length of 1 is ½, a run length of 2 is ¼, a run length of 3 is ⅛, . . . . The run length means a number of consecutive same signs. (4) Cross-correlation between respective sequences little occurs within one period. (5) Whole sequences cannot be reproduced by a small piece of sequences. (6) The PN sequence can be reproduced by a proper algorithm. The PN sequence includes m-sequence, gold sequence, Kasami sequence, etc. In addition to the aforementioned features, the m-sequence is additionally characterized in that side lobe of periodic auto-correlation is −1.

Combination of two codes (m0, m1) mapped into the S-SCH can be defined as expressed by Equation 7 below.

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$
[Equation 7]

The relation between cell group ID and combination of two codes (m0, m1) can be defined as expressed by Table 4 below.

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |

TABLE 4-continued

| $N_{ID}^{(1)}$ | $m_0$ | $m_1$ |
|---|---|---|
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |

TABLE 4-continued

| $N_{ID}^{(1)}$ | $m_0$ | $m_1$ |
| --- | --- | --- |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Figure 9:
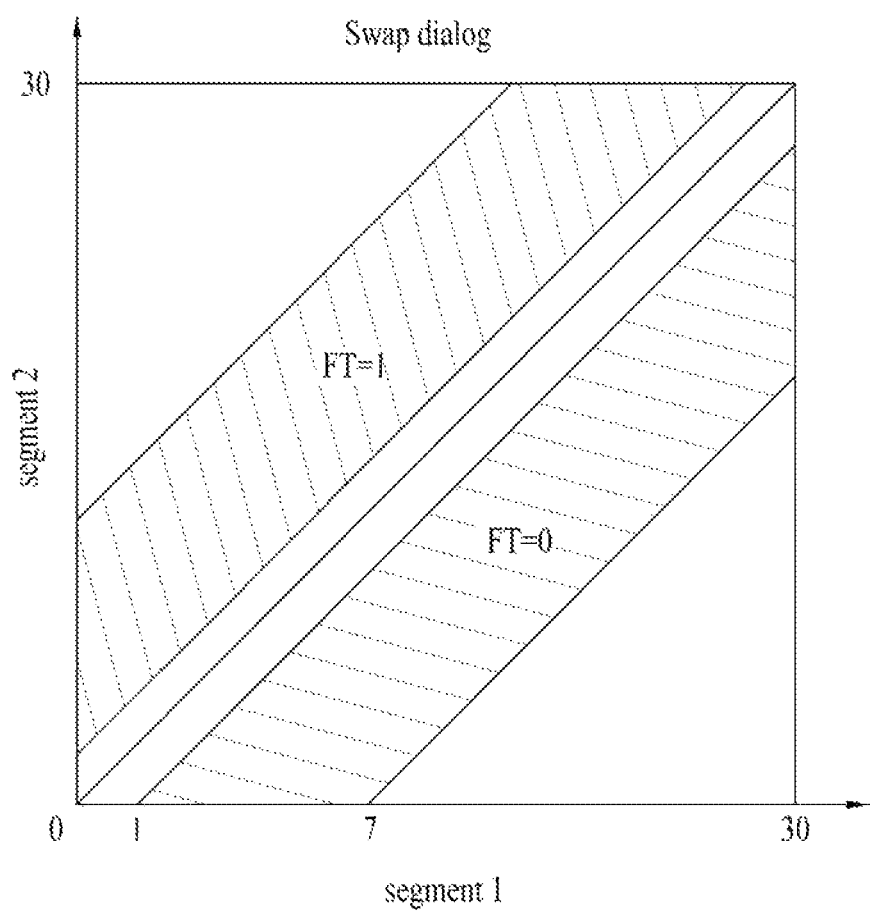

FIG. 9 illustrates combination of two short codes (m0, m1) used for the S-SCH. In the combination, the order of m0 and m1 can represent frame timing information. For example, (m0, m1) means a synchronization channel of the $0^{th}$ (0 ms) subframe, and (m1, m0) means a synchronization signal of the fifth (5 ms) subframe.

Referring to FIG. 9, segment 1 means m0, and segment 2 means m1. In Frame timing (FT), FT=0 means SSS of the 0 ms subframe, FT=1 means SSS of the 5 ms subframe. Supposing that two short codes have a length of 31 and each code can transmit 31 kinds of information (the number of sequence sets), a total of 31*31=961 kinds of cell group ID (information) can be transmitted by combination of two codes. The LTE system selects 168 kinds of combinations from 961 possible combinations to obtain optimized cell ID detection performance by considering inter-cell interference (Equation 7 or Table 4).

Figure 10:
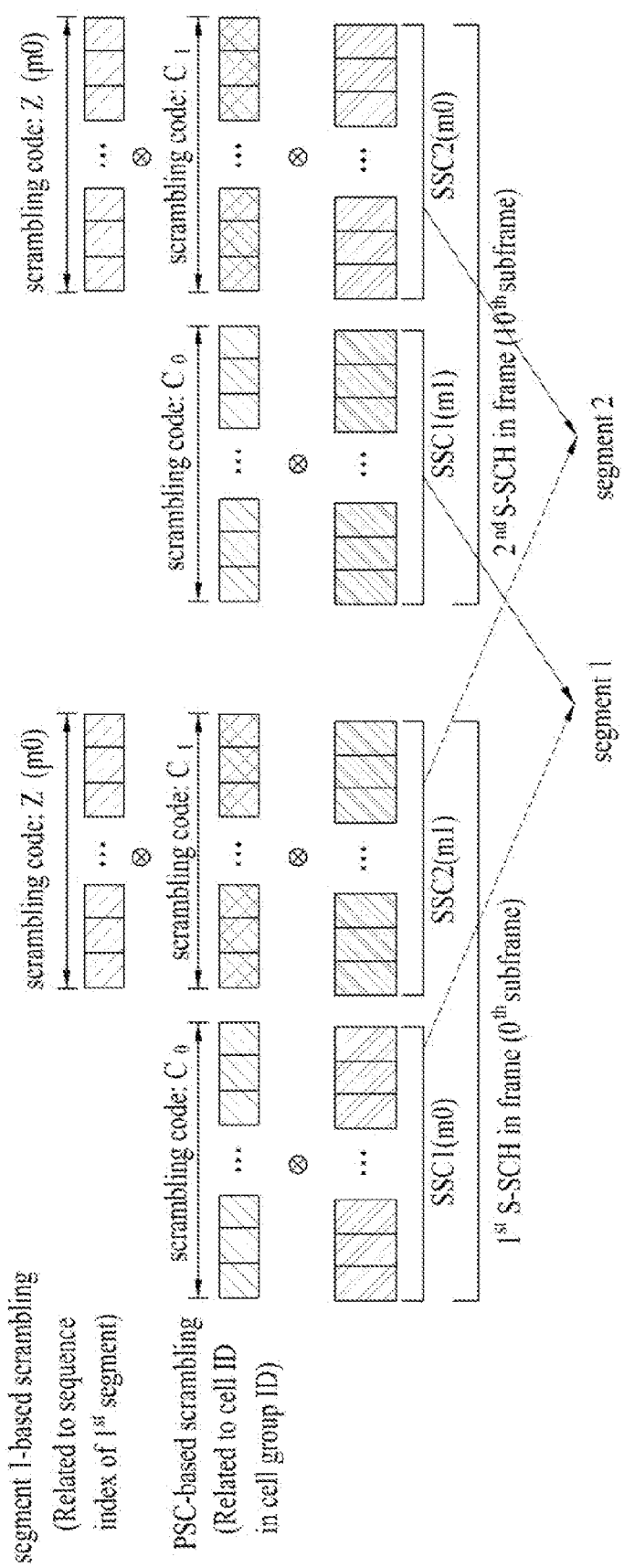

FIG. 10 illustrates a scrambling example of the S-SCH. If cell A has a combination of (1, 2) and cell B has SSS of a combination of (3, 4), the user equipment may detect combinations of (1, 4) and (3, 2) in error. This will be referred to as ambiguity. Accordingly, the SSC can be scrambled by codes defined to correspond to three PSCs one to one to reduce ambiguity between neighbouring cells. For example, if the cell A uses a PSC different from that used by the cell B and each cell scrambles the SSC through its PSC-based code, the combinations of (1, 2) and (3, 4) are strongly reinforced to reduce the possibility of ambiguity. The PSC-based scrambling code is based on the 31-length m-sequence generated from $x^5+x^2+1$. Six sequences are generated by a circular shift, and correspond to three PSC indexes in pairs.

Although the PSC-based scrambling is performed, the possibility of ambiguity still exists. For example, it is assumed that the cell A and the cell B transmit the same PSC code. Since the same PSC code is transmitted, the same scrambling code is used for the SSS, whereby ambiguity may occur. Accordingly, segment 1-based scrambling is additionally performed to reinforce the combinations of (1, 2) and (3, 4). The segment 1-based scrambling means that the SSC of the segment 2 is scrambled by codes defined to correspond to the indexes of the segment 1. Since the indexes 1 and 3 of the segment 1 are different from each other, the segment 1-based scrambling codes are different from each other, whereby the combinations of (1, 2) and (3, 4) are reinforced to solve the problem of ambiguity. The segment 1-based scrambling code is based on the 31-length m-sequence generated from $x^5+x^4+x^2+x^1+1$. Eight sequences are generated by a circular shift, and correspond to the indexes of the segment 1 in a point to multi-point mode.

Hereinafter, the SSC and the scrambling code will be described based on Equations. Sequences d(0), . . . , d(61) used for the SSS are combined by interleaving of two 31-length binary sequences. The combined sequences are scrambled by a scrambling code given by the PSS. The combinations of the two 31-length sequences that define the SSS are different from each other in subframe 0 and subframe 5, and are expressed by Equation 8 below.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 8]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In this case, the range of n is 0≤n≤30, $m_0$ and $m_1$ are associated with physical cell ID (PCID) group $N_{ID}^{(1)}$, and are defined as expressed by Equation 7 and Table 4. Sequences $s_0^{(m_0)}(n)$ and $s_1^{(m_1)}(n)$ are obtained by a circular shift of m-sequence $\tilde{s}(n)$ as expressed by Equation 9 below.

$$s_0^{(m_0)}(n) = \tilde{s}((n+m_0) \bmod 31)$$

$$s_1^{(m_1)}(n) = \tilde{s}((n+m_1) \bmod 31)$$ [Equation 9]

In this case, $\tilde{s}(i)=1-2x(i)$, 0≤i≤30, $x(\bar{i}+5)=(x(\bar{i}+2)+x(\bar{i})) \bmod 2$, 0≤ī≤25, and an initial condition is x(0)=0, x(1)=0, x(2)=0, x(3)=0, x(4)=1.

The scrambling sequences $c_0(n)$ and $c_1(n)$ are based on the PSS and obtained by a circular shift of m-sequence $\tilde{c}(n)$ as expressed by Equation 10 below.

$$c_0(n) = \tilde{c}((n+N_{ID}^{(2)}) \bmod 31)$$

$$c_1(n) = \tilde{c}((n+N_{ID}^{(2)}+3) \bmod 31)$$

In this case, $N_{ID}^{(2)} \in \{0, 1, 2\}$ represents physical cell ID within the physical cell ID group $N_{ID}^{(1)}$. Also, $\tilde{c}(i)1-2x(i)$, 0≤i≤30, $x(\bar{i}+5)=(x(\bar{i}+3)+x(\bar{i})) \bmod 2$, 0≤ī≤25, and an initial condition is x(0)=0, x(1)=0, x(2)=0, x(3)=0, x(4)=1.

The scrambling sequences $z_1^{(m_0)}(n)$ and $z_1^{(m_1)}(n)$ are obtained by a circular shift of m-sequence $\tilde{z}(n)$ as expressed by Equation 11 below.

$$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31)$$ [Equation 11]

In this case, $m_0$ and $m_1$ are defined as aforementioned. Also, $\tilde{z}=(i)=1-2x(i)$, 0≤i≤30, $x(\bar{i}+5)=(x(\bar{i}+4)+x(\bar{i}+2)+x(\bar{i}+1)+x(\bar{i})) \bmod 2$, 0≤ī≤25, and an initial condition is x(0)=0, x(1)=0, x(2)=0, x(3)=0, x(4)=1.

The physical cell ID is defined as $N_{ID}^{cell}=3N_{ID}^{(1)}+N_{ID}^{(2)}$ by combination of $N_{ID}^{(2)}$ of the PSS and $N_{ID}^{(1)}$ of the SSS. 504 (=3*168) physical cell IDs are currently defined in the LTE system.

Figure 11:
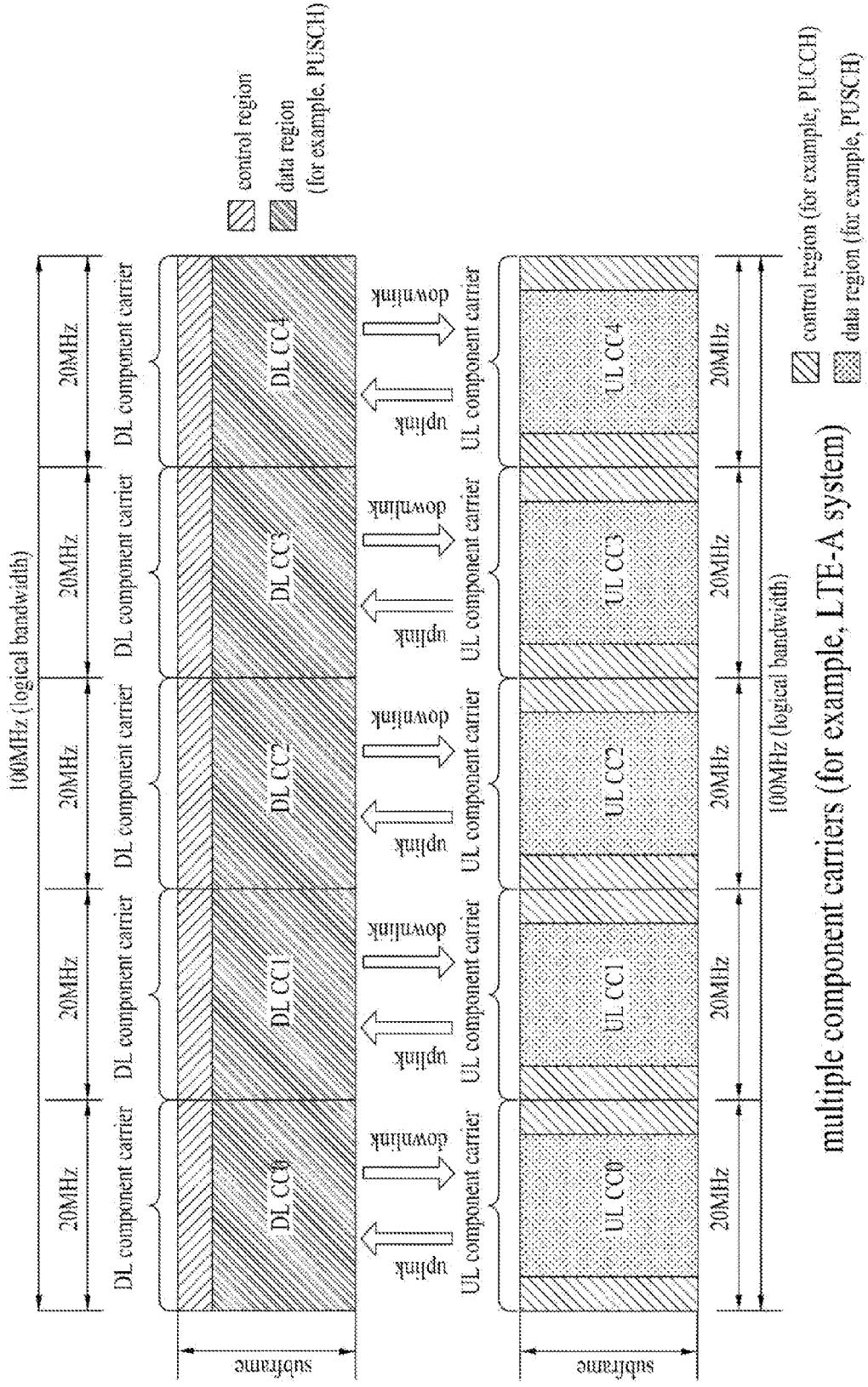
FIG. 11 is a diagram illustrating a wireless communication system that supports frequency aggregation.

FIG. 11 is a diagram illustrating a wireless communication system that supports frequency aggregation. Unlike the LTE system according to the related art, which uses a single uplink/downlink band, the LTE-A system uses carrier aggregation or bandwidth aggregation aimed to use greater uplink/downlink bandwidths by collecting a plurality of uplink/downlink frequency blocks, thereby using a broader frequency band. Each frequency block is transmitted using a component carrier (CC). In this specification, the component carrier may mean a frequency block for carrier aggregation or a center carrier of the frequency block. The component carrier and the center carrier may be used together.

Referring to FIG. 11, five CCs of 20 MHz are collected in the uplink/downlink to support a bandwidth of 100 MHz. The respective CCs may adjoin each other or not may adjoin each other in the frequency domain. FIG. 11 illustrates that a bandwidth of an uplink component carrier is the same as that of a downlink component carrier. However, the bandwidth of each component carrier can be defined independently. For example, the bandwidths of the uplink component carrier can be configured such as 5 MHz ($A_{UL}$)+20 MHz ($B_{UL}$)+20 MHz ($C_{UL}$)+20 MHz ($D_{UL}$)+5 MHz ($E_{UL}$). Also, asymmetrical carrier aggregation may be performed, in which the number of uplink component carriers is different from the number of downlink component carriers.

A system that includes a system band of a single component carrier will be referred to as a legacy system or a narrowband system. By contrast, a system that includes a system band of a plurality of component carriers and uses at least one or more component carriers as a system block of a legacy system will be referred to as an evolved system. For example, the LTE (Release-8) system and the LTE-A (Release-9) system are the systems evolved from the legacy system. Based on the aforementioned definition, the LTE system will herein be referred to a legacy system, and a user equipment that supports the LTE system will be referred to as an LTE user equipment or a legacy user equipment. Similarly, the LTE-A system will be referred to as an evolved system. Also, a user equipment that supports the LTE-A system will be referred to as an LTE-A user equipment or an evolved user equipment.

The LTE-A system should support the LTE user equipment and the LTE-A user equipment. In this case, the CC may be set as the structure of the existing system so that the CC may be backward compatible with the LTE user equipment. Alternatively, the CC may be set to be non-backward compatible with the CC. For convenience, the CC that supports both the LTE user equipment and the LTE-A user equipment will be referred to as a backward compatible CC. Also, the CC that supports the LTE-A user equipment only will be referred to as a non-backward compatible CC. Since the LTE user equipment cannot perform control/data transmission and reception in the non-backward compatible CC, the non-backward compatible CC can easily features of the LTE-A only. Also, even though the system band includes N number of CCs, it is required that frequency band that can be received by a specific user equipment is limited to M(<N) number of CCs. A method for efficiently setting up a CC in a wireless communication system that supports frequency aggregation by considering user equipment properties, network policies, load balancing, and channel status will be required. Hereinafter, the method for setting up CC will be described.

Embodiment 1

Method for Setting Up Non-Backward Compatible CC

The method for setting up non-backward compatible CC is basically intended not to transmit a legacy SCH (that is, LTE SCH) signal, whereby initial access of the LTE user equipment can be prevented from occurring. In this case, it is assumed that the LTE-A user equipment uses a legacy SCH and no LTE-A SCH exists. However, this method accompanies measurement gap in that the LTE-A user equipment camping in the CC to which the SCH is not transmitted performs tuning using CC, to which the SCH is transmitted, during intra-frequency measurement and then moves to the original camping CC to perform normal communication after acquiring synchronization. In other words, inefficient operation such as inter-frequency measurement is accompanied with the method. Accordingly, the present invention suggests a method for setting up non-backward CC while transmitting SCH of the LTE to all CCs.

Figure 12:
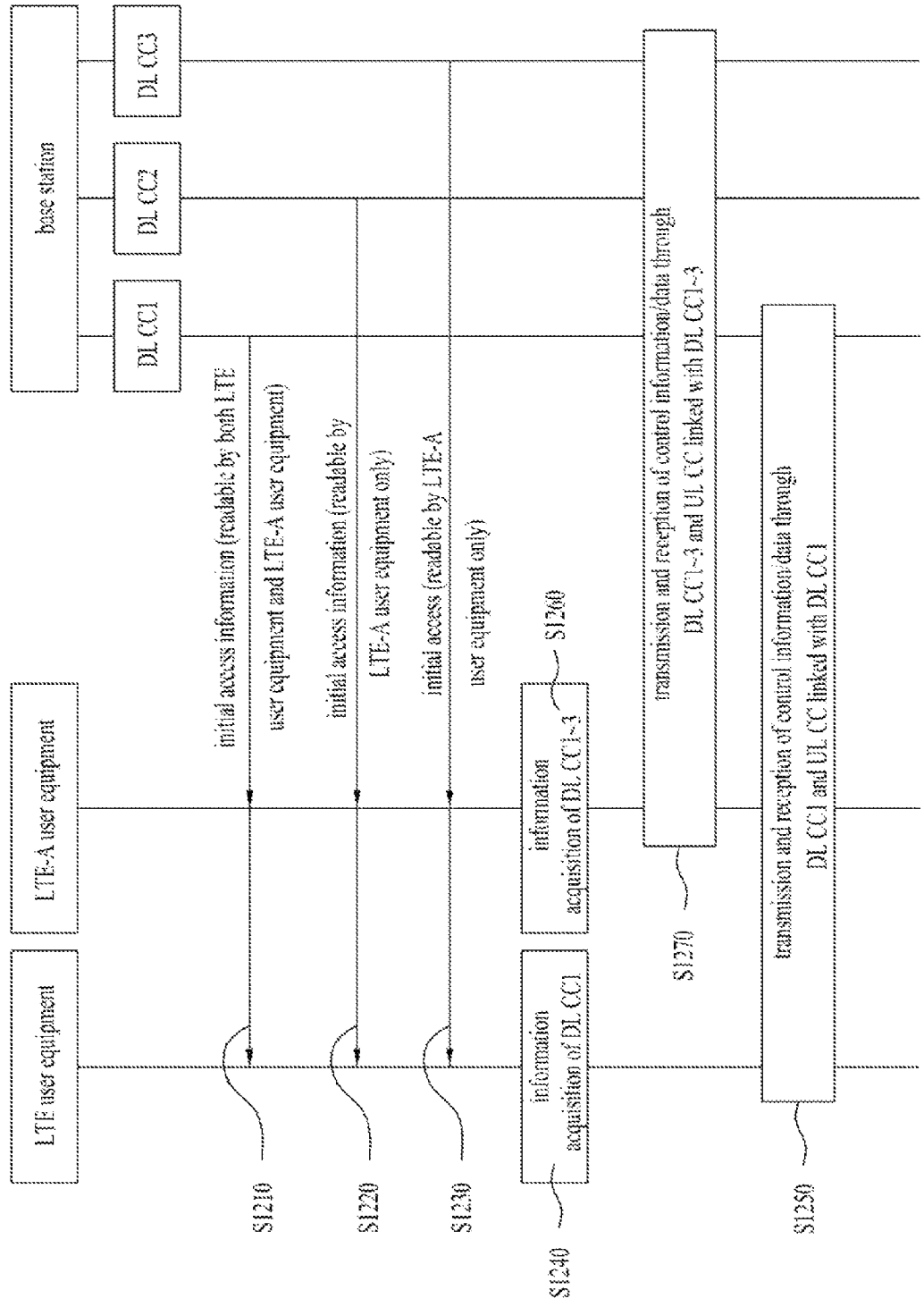
FIG. 12 is a diagram illustrating a method for setting up non-backward compatible CC in accordance with one embodiment of the present invention.

FIG. 12 is a diagram illustrating a method for setting up non-backward compatible CC in accordance with one embodiment of the present invention. It is assumed that three DL CCs exist and a separate UL CC is not illustrated in FIG. 12. Referring to FIG. 12, the base station downlink-transmits initial access information through DL CC1 (S1210). The initial access information is transmitted through the SCH and the PBCH. It is assumed that the initial access information on the DL CC1 can be read by both the LTE user equipment and the LTE-A user equipment. Also, the base station downlink-transmits the initial access information through DL CC2 and DL CC3 (S1220 and S1230). It is also assumed that the initial access information on the DL CC2 and the DL CC3 can be read by the LTE-A user equipment only. After performing initial access using the information on the DL CC1, the LTE user equipment transmits and receives control information/data through the DL CC1 and UL CC linked with the DL CC1 (S1230 and S1240). In the mean time, after performing initial access using the information on the DL CC1 to the DL CC3, the LTE-A user equipment transmits and receives control information/data through the DL CC1 to the DL CC3 and UL CC linked with the DL CC1 to the DL CC3 (S1260 and S1270). In this embodiment, it is assumed that the DL CC1 is a backward compatible CC and the DL CC2 and the DL CC3 are non-backward compatible CC. However, this is exemplary, and the backward compatible CC and the non-backward compatible CC can timely be varied. For example, the backward compatible CC and the non-backward compatible CC can be varied semi-persistently or dynamically due to network policies, load balancing, etc. In other words, the DL CC1 can be set time-variably in a manner as backward compatible CC=>non-backward compatible CC=>backward compatible CC.

At the steps S1210 to S1230, access limit of initial access information can be varied depending on the user equipment as follows.

First of all, LTE-A dedicated SCH design: since the LTE-A dedicated SCH signal is transmitted in the non-backward compatible CC, access of the LTE-A user equipment and intra-frequency measurement can be supported, whereas access of LTE user equipment is not permitted (LTE-A dedicated SCH can be supported by changing the LTE SCH).

Second, the LTE user equipment can be bypassed while the LTE SCH signal is being transmitted to all CCs.

Hereinafter, the method for setting up non-backward compatible CC will be described in more detail with reference to FIG. 13 to FIG. 15.

Embodiment 1-1

Use of PBCH CRC Mask

The LTE system uses masking in a CRC part of the PBCH to notify the user equipment of the number of transmitting antennas of the base station as illustrated in Table 2. A method for setting up non-backward compatible CC using a PBCH CRC mask includes two methods as follows.

First of all, the non-backward compatible CC can use a sequence only corresponding to the number of transmitting antennas newly used in the LTE-A by always using a PBCH CRC mask. The type of transmitting antennas newly defined in the LTE-A may be one or more. Sequences used for PBCH CRC masking for setting up non-backward compatible CC can be limited to the number of (for example, CRC mask sequences of 8 Tx) of specific antennas. Since the LTE system supports one Tx antenna, the number of 2 Tx antennas and the number of 4 Tx antennas, PBCH CRC masking sequences have been used as illustrated in Table 2. In the LTE-A, if the number of Tx antennas is increased to five or more, a new masking sequence is required to support the increased Tx antennas. The new masking sequence is preferably determined as the one spaced farthest away from the masking sequences for the existing 1, 2 and 4 antenna ports. For example, if eight Tx antennas are used in the LTE-A system, a new masking sequence can be used as illustrated in Table 5 to support the eight Tx antennas. The corresponding sequence is not always used to indicate 8 but can be used to indicate antennas more than 5.

TABLE 5

| Number of transmit antenna ports at eNode-B | PBCH CRC mask $<x_{ant,0}, x_{ant,1}, \ldots, x_{ant,15}>$ |
|---|---|
| 8 | <1, 0, 1, 0, 1, 0, 1, 0, 1, 0, 1, 0, 1, 0, 1, 0> |

Accordingly, if the LTE user equipment tries to decode the PBCH on the non-backward compatible CC by using the mask sequences for the $\{1, 2, 4\}$ antennas illustrated in Table 2, PBCH decoding is failed. In this way, as the LTE user equipment fails to perform PBCH decoding by using a new masking sequence only for the transmitting antennas extended to the PBCH of the non-backward CC, the non-backward compatible CC that cannot be used by the LTE user equipment can be set up. If the LTE user equipment fails to receive the PBCH signal for a certain time period due to failure of PBCH decoding in a certain CC, it performs cell search at next frequency raster (that is, next DL CC).

If the number of transmitting antennas actually used in the non-backward compatible CC is the same as the number of transmitting antennas notified from the PBCH CRC mask, no additional signaling is required. However, the number of actual antennas may be different from the number of antennas notified from the PBCH CRC mask. For example, the number of actual antennas may be one of $\{1, 2, 4\}$, or may be the number of another antennas used in the LTE-A system. In this case, the base station should notify the LTE-A user equipment, which have received the PBCH signal through the non-backward compatible CC, of the exact number of transmitting antennas.

To this end, the base station can notify the LTE-A user equipments of the number of actual transmitting antennas by using reserved bits from the PBCH message of Table 1, for example. The number of transmitting antennas can be indicated using $\log_2$ N-bit. In this case, N may be a number obtained by adding all types of antennas used in the LTE-A system to three types of antennas used in the LTE system. Also, N may be a number obtained by adding the remaining antennas other than those used for the PBCH CRC mask among the antennas used in the LTE-A system to three types of antennas used in the LTE system. For another example, if only the base station that can use 8 Tx antennas defines non-backward compatible CC, a new CRC mask (for example, <1,0,1,0,1,0,1,0,1,0,1,0,1,0,1,0>) may mean the non-backward compatible CC and 8 Tx antennas together. For still another example, if the number of transmitting antennas used in the non-backward compatible CC is fixed to 1, 2 or 4, a new CRC mask (for example, <1,0,1,0,1,0,1,0,1,0,1,0,1,0>) may mean the non-backward compatible CC and a defined number of transmitting antennas. For example, 4 Tx antennas are only used for the non-backward compatible CC, a new CRC mask can correspond to LTE-A dedicated CC that uses 4 Tx antennas.

Second, the base station can notify the LTE-A user equipments of the number of actual transmitting antennas by using a mask sequence different from the PBCH CRC mask for the number of antennas {1, 2, 4} used in the existing LTE system. In order to use this method, instead of the PBCH CRC mask used in the existing system, another new mask for antennas used in the LTE-A including {1, 2, 4} antennas should be used. Examples of the new PBCH CRC mask are illustrated in Table 6 to Table 8. In Table 6 to Table 8, the number of Tx antenna ports and the mapping order of the CRC mask may be varied.

TABLE 6

| Number of transmit antenna ports at eNode-B | PBCH CRC mask $<x_{ant,0}, x_{ant,1}, \ldots, x_{ant,15}>$ |
|---|---|
| 1 | <0, 0, 1, 1, 0, 0, 1, 1, 0, 0, 1, 1, 0, 0, 1, 1> |
| 2 | <1, 1, 0, 0, 1, 1, 0, 0, 1, 1, 0, 0, 1, 1, 0, 0> |
| 4 | <0, 0, 0, 0, 1, 1, 1, 1, 0, 0, 0, 0, 1, 1, 1, 1> |
| 8 | <1, 1, 1, 1, 0, 0, 0, 0, 1, 1, 1, 1, 0, 0, 0, 0> |

TABLE 7

| Number of transmit antenna ports at eNode-B | PBCH CRC mask $<x_{ant,0}, x_{ant,1}, \ldots, x_{ant,15}>$ |
|---|---|
| 1 | <0, 1, 1, 0, 0, 1, 1, 0, 0, 1, 1, 0, 0, 1, 1, 0> |
| 2 | <1, 0, 0, 1, 1, 0, 0, 1, 1, 0, 0, 1, 1, 0, 0, 1> |
| 4 | <0, 0, 1, 1, 0, 0, 1, 1, 0, 0, 1, 1, 0, 0, 1, 1> |
| 8 | <1, 1, 0, 0, 1, 1, 0, 0, 1, 1, 0, 0, 1, 1, 0, 0> |

TABLE 8

| Number of transmit antenna ports at eNode-B | PBCH CRC mask $<x_{ant,0}, x_{ant,1}, \ldots, x_{ant,15}>$ |
|---|---|
| 1 | <0, 1, 1, 0, 1, 1, 0, 1, 1, 0, 1, 1, 0, 1, 1, 0> |
| 2 | <1, 0, 0, 1, 0, 0, 1, 0, 0, 1, 0, 0, 1, 0, 0, 1> |
| 4 | <0, 1, 1, 1, 0, 1, 1, 1, 0, 1, 1, 1, 0, 1, 1, 1> |
| 8 | <1, 0, 1, 0, 1, 0, 1, 0, 1, 0, 1, 0, 1, 0, 1, 0> |

Preferably, except for the sequence defined in the existing LTE, the sequence of which minimum distance per sequence is the longest is used as the PBCH CRC mask sequence. To this end, a complementary sequence can be used. For example, <0,1,0,1> and <1,0,1,0> are in a complementary relation. In this way, if the newly defined PBCH CRC mask sequence is used, since the LTE user equipment cannot perform PBCH decoding, it can set up the corresponding CC as the non-backward compatible CC.

Embodiment 1-2

Use of Location of PBCH

The LTE user equipment performs cell search and receives the PBCH signal during an initial cell access procedure. In other words, the LTE user equipment performs cell search through the PSS and the SSS and searches for the PBCH signal at next symbol of the OFDM symbol that has received the PSS and the SSS. In this structure, the location of the symbol to which the PBCH signal is transmitted is varied so that the LTE user equipment may fail to decode the PBCH, whereby the non-backward compatible CC can be set up. In other words, the time location relation between the PSS/SSS and the PBCH is varied depending on a legacy service and an LTE-A dedicated service, whereby access of the legacy user equipment (that is, LTE user equipment) to the LTE-A dedicated CC can be restricted.

(a) and (b) of FIG. 13 illustrate that the non-backward compatible CC is set up by using the location of the PBCH. (a) of FIG. 13 illustrates an example of general CP, and (b) of FIG. 13 illustrates an example of extended CP. Referring to (a) of FIG. 13, the PBCH signal can be transmitted to the $\{3^{rd}, 4^{th}, 5^{th}, 6^{th}\}$ OFDM symbols of the slot #1 instead of the $\{0^{th}, 1^{st}, 2^{nd}, 3^{rd}\}$ OFDM symbols of the slot #1 corresponding to the original transmission location. However, this is exemplary, and the PBCH signal can be transmitted to various locations such as the $\{1^{st}, 2^{nd}, 3^{rd}, 4^{th}\}$ OFDM symbols of the slot #1, the $\{2^{nd}, 3^{rd}, 4^{th}, 5^{th}\}$ OFDM symbols of the slot #1, the $\{3^{rd}, 4^{th}\}$ of the slot #0, and the $\{0^{th}, 1^{st}\}$ OFDM symbols of the slot #1. Likewise, although (b) of FIG. 13 illustrates that the PBCH signal is transmitted to the $\{2^{nd}, 3^{rd}, 4^{th}, 5^{th}\}$ OFDM symbols of the slot #1 instead of the $\{0^{th}, 1^{st}, 2^{nd}, 3^{rd}\}$ OFDM symbols of the slot #1 corresponding to the original transmission location, the PBCH signal may be transmitted to various locations such as the $\{1^{st}, 2^{nd}, 3^{rd}, 4^{th}\}$, OFDM symbols of the slot #1, the $\{3^{rd}\}$ OFDM symbol of the slot #0, and the $\{0^{th}, 1^{st}, 2^{nd}\}$ OFDM symbols of the slot #1. Moreover, the PBCH signal may be transmitted by changing its frequency location in addition to changing its time location.

Embodiment 1-3

Use of Location of SCH

In the same manner as that the location of the PBCH is changed in the Embodiment 1-2, non-backward compatible CC, which does not support the LTE user equipment, can be set by change of the PSS and/or SSS. As described in FIG. 7, the PSS is transmitted using 72 subcarriers of the last OFDM symbol of the first slot (that is, slot 0, slot 10) of the $0^{th}$ and fifth subframes within a radio frame of 10 ms. Although the SSS has the same slot/frequency allocation as that of the PSS, it is mapped faster than the PSS as much as one symbol. In this structure, the location of the symbol to which the P-BCH signal and/or the S-BCH signal is transmitted is changed, whereby non-backward compatible CC, which cannot be accessed by the LTE user equipment, can be set up. In other words, the time location relation between the PSS/SSS and the PBCH is varied depending on a legacy service and an LTE-A dedicated service, whereby access of the legacy user equipment (that is, LTE user equipment) to the LTE-A dedicated CC can be restricted.

(a) and (b) of FIG. 14 illustrate that the non-backward compatible CC is set up by using the location of the SCH. (a) of FIG. 14 illustrates an example of general CP, and (b) of FIG. 14 illustrates an example of extended CP. For convenience, (a) and (b) of FIG. 14 illustrate the $0^{th}$ subframe only. (a) of FIG. 14 illustrates that the PSS is transmitted to the $4^{th}$ OFDM symbol of the slot #0 instead of the $6^{th}$ OFDM symbol of the slot #0, which corresponds to the original transmission location of the PSS, and the SSS is transmitted to the $3^{rd}$ OFDM symbol of the slot #0 instead of the $5^{th}$ OFDM symbol of the slot #0, which corresponds to the original transmission location of the SSS. Likewise, (b) of FIG. 14 illustrates that the PSS is transmitted to the $4^{th}$ OFDM symbol of the slot #0 instead of the $5^{th}$ OFDM symbol of the slot #0, which corresponds to the original transmission location of the PSS, and the SSS is transmitted to the $3^{rd}$ OFDM symbol of the slot #0 instead of the $4^{th}$ OFDM symbol of the slot #0, which corresponds to the original transmission location of the SSS. However, this is only exemplary, and the PSS and the SSS can be transmitted through other OFDM symbols. Also, the locations of both the PSS and the SSS may not be changed. In other words, the location of either the PSS or the SSS may be changed. Also, the PSS and/or the SSS may be transmitted by changing its frequency location in addition to changing its time location. Moreover, non-backward compatible CC may be set up by using the method of changing the transmission locations of both the SCH signal and the PBCH signal through combination of the Embodiment 1-2 and the Embodiment 1-3.

FIG. 15 is a diagram illustrating an example of terminal access restricted by time relation between PSS and SSS. In the LTE system, the PSS and the SSS are transmitted in the order of SSS+PSS as illustrated in FIG. 7. However, in case of non-backward compatible CC, the PSS and the SSS can be transmitted in the order of PSS+SSS. Also, the time relation between the PSS and the SSS in the non-backward compatible CC can be set up differently from the time relation of the LTE system like PSS+Data+SSS ((b) of FIG. 15), SSS+data+PSS ((c) of FIG. 15), and SSS+data0+data1+PSS (not shown) to restrict access of the LTE user equipment.

Embodiment 1-4

Use of Additional PSC

An LTE-A dedicated root index can be defined to indicate non-backward compatible CC. In this case, an LTE-A dedicated root index can be defined using a detection relation of the PSS. In case of the LTE system, 29 and 34 of three indexes u=25, 29, 34 defined from the ZC sequence of a 63-length are in a conjugate symmetry relation. Accordingly, u=38 (=63-25, that is, ZC sequence length-root index) in a complex conjugate relation with u=25 can be used as the LTE-A dedicated root index. In other words, the ZC sequence of the root index of 38 can be used to indicate that the corresponding CC is the non-backward compatible CC. Also, a method of reserving an index which is not in a complex conjugate relation can be used as a detailed method for reservation of one of PSCs as a cell ID indicator for non-backward compatible CC. For example, if the PSC has root indexes of 25, 29 and 34, since 29 and 34 are in a complex conjugate relation, 25 can be used as a cell ID indicator for non-backward compatible CC.

Embodiment 1-5

Use of Additional SSC Index

Indexes of SSC combination can be increased to be used for non-backward compatible CC. When the indexes are increased, the following can be considered. In other words, it is considered that different indexes are reserved for combination of SSC1 and SSC2 but no ambiguity exists in all candidates. In this case, the following two references are provided. First of all, different indexes are selected through segment 1-based scrambling so that that ambiguity is resolved. The selected set should include indexes different from one another. This is to resolve ambiguity, which may occur in case of swapping of m0 and m1, in addition to the aforementioned ambiguity. Second, if the number of segment 1-based scrambling codes is limited, the case where ambiguity combination among combinations belongs to all candidates is excluded.

For example, if index of $N_{ID}^{(1)}$ of 0, 2, 4, ..., 28 is selected in Table 4, (m0, m1) can be expressed as follows: (0,1) (2,3) (4,5) (6,7) (8,9) (10,11) (12,13) (14,15) (16,17) (18,19) (20, 21) (22,23) (24,25) (26,27) (28,29) [a total of fifteen]. If the number of segment 1-based scrambling codes is 8, 15 combinations can be divided into four groups below.

Group 1: (0,1) (2,3) (4,5) (6,7)

Group 2: (8,9) (10,11) (12,13) (14,15)

Group 3: (16,17) (18,19) (20,21) (22,23)

Group 4: (24,25) (26,27) (28,29)

If segment 1-based scrambling is used, the problem of ambiguity is resolved within a group. However, ambiguity may occur between the respective groups. For example, since 0 and 8 use the same segment 1-based scrambling code in (0, 1) of the group 1 and (8, 9) of the group 2, ambiguity of (0, 9) or (8, 1) may occur. However, since (0, 9) or (8, 1) [swapping of (1, 8)] is not included in 168 combinations of Table 8, the problem of ambiguity does not occur. Accordingly, the following sets can finally be selected: (0,1) (2,3) (4,5) (6,7) (8,9) (10,11) (12,13) (14,15) (16,17) (18,19) (20,21) (22,23) (24, 25) (26,27) (28,29) [a total of fifteen]. Accordingly, a total of 3*5=45 cell IDs can be obtained additionally.

Embodiment 1-6

Use of Segment 2-Based Scrambling

In the existing SSC structure, SSC1 is scrambled by a segment 2-based code to generate a new physical cell ID (PCID) for non-backward compatible CC. For example, the cell ID defined in the LTE system is used as it is, and segment 2-based scrambling can be applied to the SS transmitted from the non-backward compatible CC. In this way, the LTE-A user equipment can recognize the PCID of the non-backward compatible CC without affecting the LTE user equipment. In other words, the non-backward compatible CC can be indicated by the scrambling method. This example is expressed by Equation 12 to Equation 14.

$$d(2n) = \begin{cases} s_0^{(m_0)}(n)c_0(n)z_1^{(m_1)}(n) & \text{in subframe } 0 \\ s_1^{(m_1)}(n)c_0(n)z_1^{(m_0)}(n) & \text{in subframe } 5 \end{cases} \quad \text{[Equation 12]}$$

$$d(2n+1) = \begin{cases} s_1^{(m_1)}(n)c_1(n) & \text{in subframe } 0 \\ s_0^{(m_0)}(n)c_1(n) & \text{in subframe } 5 \end{cases}$$

In this case, $0 \leq n \leq 30$, $m_0$ and $m_1$ are the same as those defined in Table 4 in association with the PCID group. $s_0^{(m_0)}(n)$ and $z_1^{(m_m)}(n)$ represent SSC, $c_0(n)$ and $c_1(n)$ are PSS based scrambling codes, and $z_1^{(m_0)}(n)$ and $z_1^{(m_1)}(n)$ are segment 2-based scrambling codes. The Equation 12 illustrates that segment 2-based scrambling is applied to SSC1.

$$d(2n) = \begin{cases} s_0^{(m_0)}(n)c_1(n) & \text{in subframe } 0 \\ s_1^{(m_1)}(n)c_1(n) & \text{in subframe } 5 \end{cases} \quad \text{[Equation 13]}$$

$$d(2n+1) = \begin{cases} s_1^{(m_1)}(n)c_0(n)z_1^{(m_0)}(n) & \text{in subframe } 0 \\ s_0^{(m_0)}(n)c_0(n)z_1^{(m_1)}(n) & \text{in subframe } 5 \end{cases}$$

The Equation 13 illustrates that the order of the PSC-based scrambling code applied to the SSC1 and the SSC2 is opposite to that of the LTE system.

$$d(2n) = \begin{cases} s_0^{(m_0)}(n)c_1(n)z_1^{(m_1)}(n) & \text{in subframe 0} \\ s_1^{(m_1)}(n)c_1(n)z_1^{(m_0)}(n) & \text{in subframe 5} \end{cases}$$ [Equation 14]

$$d(2n+1) = \begin{cases} s_1^{(m_1)}(n)c_0(n) & \text{in subframe 0} \\ s_0^{(m_0)}(n)c_0(n) & \text{in subframe 5} \end{cases}$$

The Equation 14 illustrates a combination example of the Equations 12 and 13. In other words, in the Equation 14, the order of the PSC-based scrambling code applied to the SSC1 and the SSC2 is varied and segment 2-based scrambling is applied to the SSC1.

The Equations 12 to 14 are directed to a method of using a scrambling code conventionally defined. However, if there is little load of additional memory, additional sequence can be defined like Equations 15 and 16.

$$d(2n) = \begin{cases} s_0^{(m_0)}(n)c_0(n)z_2^{(m_1)}(n) & \text{in subframe 0} \\ s_1^{(m_1)}(n)c_0(n)z_2^{(m_0)}(n) & \text{in subframe 5} \end{cases}$$ [Equation 15]

$$d(2n+1) = \begin{cases} s_1^{(m_1)}(n)c_1(n) & \text{in subframe 0} \\ s_0^{(m_0)}(n)c_1(n) & \text{in subframe 5} \end{cases}$$

In this case, $z_2^{(m_0)}(n)=\tilde{z}((n+(m_0 \bmod 8+n_{off})) \bmod 31)$ $z_2^{(m_1)}(n)=\tilde{z}((n+(m_1 \bmod 8+n_{off})) \bmod 31)$ and $n_{off}$ is defined differently from the existing scrambling code (for example, $n_{off}=8$). The Equation 14 illustrates that a segment 2-based scrambling code is additionally defined.

$$d(2n) = \begin{cases} s_0^{(m_0)}(n)c_2(n) & \text{in subframe 0} \\ s_1^{(m_1)}(n)c_2(n) & \text{in subframe 5} \end{cases}$$ [Equation 16]

$$d(2n+1) = \begin{cases} s_1^{(m_1)}(n)c_3(n)z_1^{(m_0)}(n) & \text{in subframe 0} \\ s_0^{(m_0)}(n)c_3(n)z_1^{(m_1)}(n) & \text{in subframe 5} \end{cases}$$

In this case, $c_2(n)=\tilde{c}((n'+N'_{ID}) \bmod 31)$ $c_3(n)=\tilde{c}((n+N'_{ID}+1) \bmod 31)$, and $N'_{ID}$ is defined differently from the existing scrambling code (for example, $N'_{ID}=6$).

Embodiment 1-7

Use of Phase Change of SSC

Indication information for the non-compatible CC can be implemented through phase modulation. For example, if a code combination of (m0, m1) is expressed by (SSC1, SSC2), indication information on the $0^{th}$ subframe can be identified from that on the $5^{th}$ subframe. For convenience, an application example of scrambling has been omitted.

[Case 1-1]
backward compatible CC: (SSC1, SSC2) for $0^{th}$ (SSC2, SSC1) for $5^{th}$
non-backward compatible CC: (−SSC1, −SSC2) for $0^{th}$ (−SSC2, −SSC1) for $5^{th}$
[Case 1-2]
backward compatible CC: (SSC1, SSC2) for $0^{th}$ (SSC2, SSC1) for $5^{th}$
non-backward compatible CC: (SSC1, −SSC2) for $0^{th}$ (SSC2, −SSC1) for $5^{th}$

[Case 1-3]
backward compatible CC: (SSC1, SSC2) for $0^{th}$ (SSC2, SSC1) for $5^{th}$
non-backward compatible CC: (SSC1, −SSC2) for $0^{th}$ (−SSC2, SSC1) for $5^{th}$ If another CC in addition to non-backward compatible CC is defined, it can be identified as follows.

[Case 2-1]
backward compatible CC: (SSC1, SSC2) for $0^{th}$ (SSC2, SSC1) for $5^{th}$
non-backward compatible CC: (exp(j*2*pi*⅓)*SSC1, exp(j*2*pi*⅓)*SSC2) for $0^{th}$ (exp(j*2*pi*⅓)*SSC2, exp(j*2*pi*⅓)*SSC1) for $5^{th}$
another type CC: (exp(j*2*pi*⅔)*SSC1, exp(j*2*pi*⅔)*SSC2) for $0^{th}$ (exp(j*2*pi*⅔)*SSC2, exp(j*2*pi*⅔)*SSC1) for $5^{th}$
[Case 2-2]
backward compatible CC: (SSC1, SSC2) for $0^{th}$ (SSC2, SSC1) for $5^{th}$
non-backward compatible CC: (SSC1, exp(j*2*pi*⅓)*SSC2) for $0^{th}$ (SSC2, exp(j*2*pi*⅓)*SSC1) for $5^{th}$
another type CC: (SSC1, exp(j*2*pi*⅔)*SSC2) for $0^{th}$ (SSC2, exp(j*2*pi*⅔)*SSC1) for $5^{th}$
[Case 2-3]
backward compatible CC: (SSC1, SSC2) for $0^{th}$ (SSC2, SSC1) for $5^{th}$
non-backward compatible CC: (SSC1, exp(j*2*pi*⅓)*SSC2) for $0^{th}$ (exp(j*2*pi*⅓)*SSC2, SSC1) for $5^{th}$
another type CC: (SSC1, exp(j*2*pi*⅔)*SSC2) for $0^{th}$ (exp(j*2*pi*⅔)*SSC2, SSC1) for $5^{th}$ Embodiment 1-8

Use of PBCH Scrambling

As described with reference to FIG. 6, cell-specific scrambling is performed at a bit-level during PBCH transmission. Bit-level cell-specific scrambling is applied to the PBCH according to the LTE system as expressed by Equation 17.

$$\tilde{b}(i)=(b(i)+c(i)) \bmod 2$$ [Equation 17]

In this case, $b(0), \ldots, b(M_{bit}-1)$ are PBCH information bit sequences, and $M_{bit}$ represents bits transmitted on the PBCH. The PBCH information bit sequences are scrambled using a cell-specific scrambling sequence c(i) before modulation. The scrambling sequences are reset to cell ID ($c_{init}=N_{ID}^{cell}$).

If the SCH signal and the PBCH signal are basically transmitted through all downlink CCs, LTE-A specific scrambling can be performed for the PBCH signal of the corresponding CC to set up the non-backward compatible CC. The LTE-A specific scrambling means that scrambling sequences, which can be viewed by the LTE-A user equipments only, are used. The LTE-A specific scrambling may be replaced with cell-specific scrambling of the PBCH. Also, the LTE-A specific scrambling can be performed additionally after cell-specific scrambling of the PBCH. In this case, the LTE-A specific scrambling serves as null scrambling for the backward compatible CC.

In the mean time, supposing that data transmission and reception is performed in one cell using multiple CCs through carrier aggregation, if contents of the PBCH signal transmitted to each CC are the same as one another or some of the content are different from the other contents, a peak-to-average power ratio (PAPR) may be increased. If multiple CCs are used in one cell, separate scrambling (that is, CC-specific scrambling) per CC can be used to reduce the PAPR. To this end, CC ID is allocated so as not to be overlapped with cell ID used by the LTE user equipment, and the scrambling sequence can be generated using the allocated CC ID as a seed. Also, the scrambling sequence reset to the cell ID during cell-specific scrambling can be reset to a new value such as CC index, combination of cell ID and CC index, or LTE-A specific parameter instead of cell ID.

For another example, in order to non-backward compatible CC using scrambling of the PBCH, symbol-level scrambling can be applied to the PBCH. Symbol-level scrambling can be applied to the PBCH while the existing cell-specific bit-level scrambling is being used. Symbol-level scrambling may also be applied to the PBCH while LTE-A specific bit-level scrambling is being used. Also, in order to non-backward compatible CC, instead of the existing bit-level scrambling, symbol-level scrambling may only be applied to the PBCH.

The aforementioned methods may be applied to a specific subframe only, whereby backward compatible subframes and non-backward compatible subframes may be set up by TDM.

Embodiment 2

Method for Setting Up Non-Access CC

The Embodiment 1 has been directed to non-backward compatible CC that cannot be accessed initially by the LTE user equipment. In the mean time, CC that cannot be accessed by the LTE-A user equipment as well as the LTE user equipment may be considered. This CC will be referred to as non-access CC. On the other hand, CC that can be accessed by the LTE user equipment or the LTE-A user equipment will be referred to as access CC.

Figure 16:
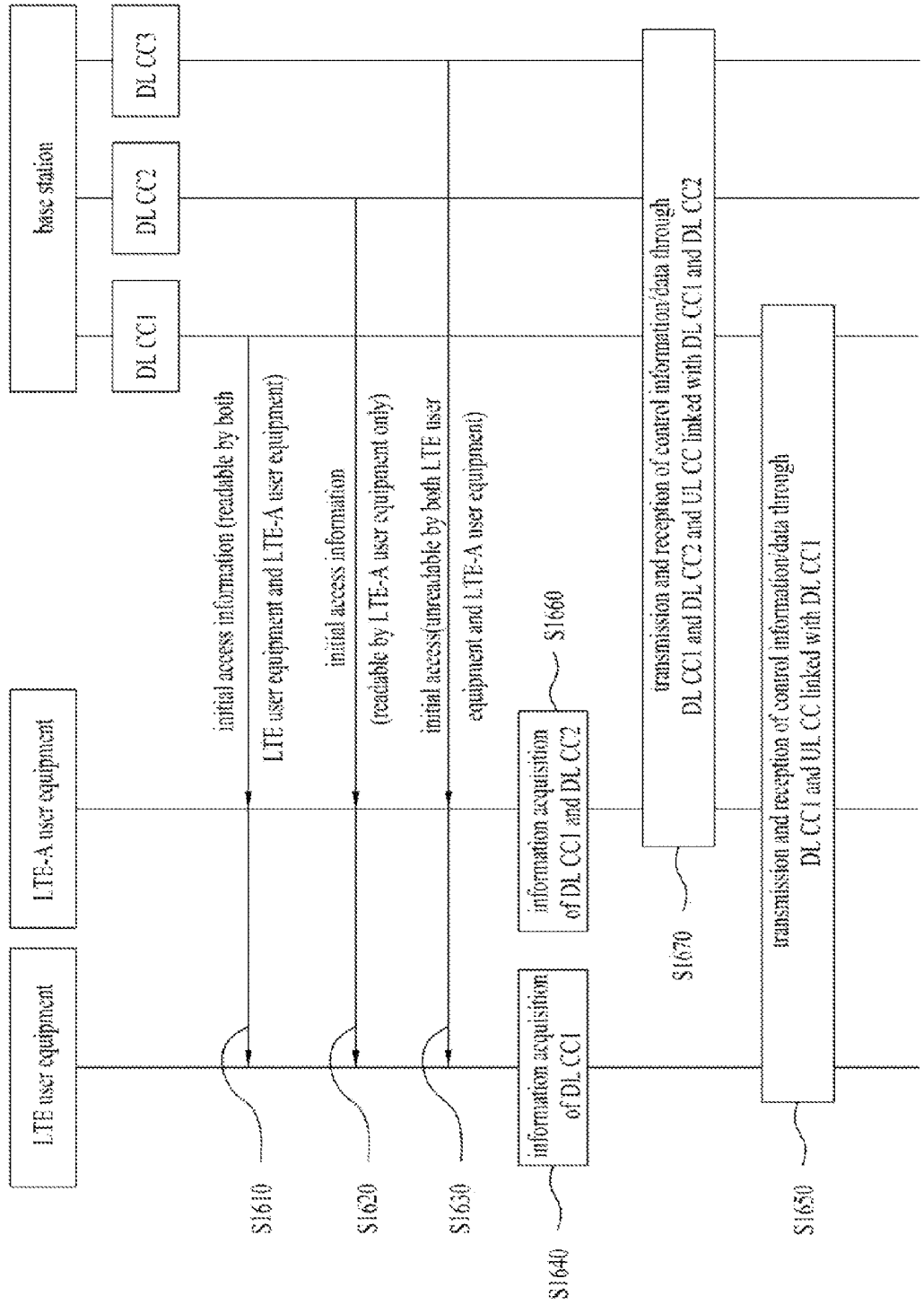
FIG. 16 is a diagram illustrating a method for setting up non-access CC in accordance with one embodiment of the present invention.

FIG. 16 is a diagram illustrating a method for setting up non-access CC in accordance with one embodiment of the present invention. For convenience, three DL CCs are illustrated in FIG. 16, and UL CC is not illustrated therein. Referring to FIG. 16, the base station downlink-transmits initial access information through DL CC1 (S1610). The initial access information is transmitted through the SCH and the PBCH. It is assumed that the initial access information on the DL CC1 can be read by both the LTE user equipment and the LTE-A user equipment. Also, the base station downlink-transmits the initial access information through DL CC2 and DL CC3 (S1620 and S1630). It is also assumed that the initial access information on the DL CC2 can be read by the LTE-A user equipment only. Meanwhile, it is assumed that the initial access information cannot be read by both the LTE user equipment and the LTE-A user equipment. After performing initial access using the information on the DL CC1, the LTE user equipment transmits and receives control information/data through the DL CC1 and UL CC linked with the DL CC1 (S1630 and S1640). In the mean time, after performing initial access using the information on the DL CC1 to the DL CC3, the LTE-A user equipment transmits and receives control information/data through the DL CC1 and the DL CC2 and UL CC linked with the DL CC1 and the DL CC2 (S1660 and S1670). In other words, DL CC3 is set to non-access CC.

In this embodiment, it is assumed that the DL CC1 is a backward compatible CC, the DL CC2 is a non-backward compatible CC, and the DL CC3 is a non-access CC. However, this is exemplary, and the backward compatible CC, the non-backward compatible CC, and the non-access CC can timely be varied. For example, the backward compatible CC, the non-backward compatible CC and the non-access CC can be varied semi-persistently or dynamically due to network policies, load balancing, etc. In other words, the DL CC1 can be set time-variably in a manner as backward compatible CC=>non-backward compatible CC=>non-access CC=>non-backward compatible CC.

Embodiment 2-1

Use of PBCH CRC Mask

A new PBCH CRC mask can be defined to set up non-access CC. In other words, the LTE user equipment cannot access the non-access CC due to only the fact that the new CRC mask has been defined. The extended PBCH CRC mask defined in Table 5 may be used as the CRC mask which is not permitted for initial access but intended to obtain PBCH information. In the same manner as the LTE system, the LTE user equipments are permitted to perform CRC backward-masking for 4 Tx only, thereby failing to perform decoding. Non-access CC may be measured for handover between CCs or a user equipment, which has already finished initial access, may be allowed to read PBCH information by using newly defined CRC masking. In this case, the number of Tx antennas which are actually used, can be transmitted using reserved bits of the PBCH. Also, a plurality of CRC masks may be defined additionally to be mapped into antenna information. In this case, although it is not advantageous in that CRC masks are increased, it is advantageous in that PBCH resources can be saved.

In accordance with another method, even though a new CRC mask is used as illustrated in Table 6 to Table 8, CRC masks for 8 Tx cannot be accessed initially by the LTE-A user equipment but may be read by the LTE-A user equipment already allowed for access. In this case, actual antenna information can be transmitted using PBCH reserved bits during 8 Tx transmission.

In accordance with still another method, two types of CRC masks can be generated for {1, 2, 4, 8} antennas in pairs. The first CRC mask (defined as Table A) is generated as adding a new mask defined for antenna 8 to the existing CRC mask defined for {1, 2, 4} antennas in the LTE system. The second CRC mask (defined as Table B) is configured by CRC masking sequences newly designed for {1, 2, 4, 8} antennas. The CRC masking sequences defined in Table A are applied to the access CC, while the CRC masking sequences defined in Table B are applied to non-access CC. Access of the LTE-A user equipment to the non-access CC can be avoided by backward-masking for the CRC masking sequences defined in Table A during initial access (and handover) of the LTE-A user equipment. After access of the LTE-A user equipment to the non-access CC, the LTE-A user equipment can recognize the non-access CC through RRC signaling or L1/L2 signaling. Alternatively, the LTE-A user equipment may be notified through Table B to perform CRC backward-masking, thereby enabling measurement. In this case, it is not required to signal the number of actual antennas regardless of types of CC (that is, regardless of access CC or non-access CC).

In accordance with further still another method, in addition to four types of CRC masks of 1, 2, 4, 8, a new CRC mask may further be defined, whereby the CRC masks cannot be accessed initially by the LTE-A user equipment but may be read by the LTE-A user equipment already allowed for access. Likewise, the number of actual transmitting antennas of the PBCH signal can be notified using reserved bits.

Embodiment 2-2

Use of Location of PBCH

As the location of the PBCH is varied from that defined in the existing LTE system, the LTE-A user equipment as well as the LTE user equipment may not be able to access the non-access CC. For example, the location of the PBCH can be varied as illustrated in FIG. 12. In this case, the LTE user equipment is not able to access the non-access CC on the ground that the location of the PBCH is varied. Also, the LTE-A user equipment is not able to access the non-access CC if it intends to perform decoding of the PBCH at the existing location. Likewise, if the user equipment already permitted to access the non-access CC intends to acquire PBCH information from the non-access CC, it can acquire the PBCH information by using the location of the PBCH defined as illustrated in FIG. 12.

Embodiment 2-3

Use of Location of SCH

As the location of the SCH is varied from that defined in the existing LTE system, the LTE-A user equipment as well as the LTE user equipment may not be able to access the non-access CC. For example, the location of the SCH can be varied as illustrated in FIGS. 13 and 14. In this case, the LTE user equipment is not able to access the non-access CC on the ground that the location of the SCH is varied. Also, the LTE-A user equipment is not able to access the non-access CC if it intends to perform decoding of the PBCH at the existing location. Likewise, if the user equipment already permitted to access the non-access CC intends to acquire SCH information from the non-access CC, it can acquire the SCH information by using the location of the SCH defined as illustrated in FIGS. 13 and 14.

Embodiment 2-4

Use of Scrambling of PBCH

As described in the Embodiment 1-8, non-access CC can be set up in such a manner that bit scrambling or symbol scrambling applied to the PBCH is defined variably. The LTE-A user equipment already permitted to access the non-access CC intends to acquire system information from the non-access CC through the PBCH, it can acquire the system information by using scrambling defined variably.

Embodiment 2-5

Use of Cell ID Reserved for Non-Access CC

The cell ID obtained as described in the Embodiments 1-4 and 1-5 can be used to indicate the non-access CC. The LTE-A user equipment already permitted to access the non-access CC can acquire information by using the cell ID reserved for the non-access CC.

Embodiment 3

Method for Setting Up LTE-A Non-Access CC

In order to prevent access of the LTE-A user equipment while permitting access of the LTE user equipment, the SCH and the PBCH defined for the existing LTE system can be configured in the same structure. If the SCH structure of the existing LTE system is maintained, it is not be able to prevent access of the LTE-A user equipment at the step of acquiring the SCH. Accordingly, information (for example, information on LTE-A non-access CC) indicating whether initial access is permitted to the LTE-A user equipment can be indicated using a reserved field of the PBCH defined in the LTE system. The LTE-A non-access CC represents CC to which initial access of the LTE-A user equipment is not permitted. Table 9 illustrates PBCH message (RRC master information block) according to one embodiment of the present invention.

TABLE 9

-- ASN1START
MasterInformationBlock ::= SEQUENCE {
    dl-Bandwidth          ENUMERATED
                              {n6,n15,n25,n50,n75,n100,spare2,spare1},
    phich-Configuration     PHICH-Configuration,
    systemFrameNumber     BIT STRING (SIZE (8)),
    dlcc-BlockConfiguration    BIT STRING (SIZE (n)),
    spare                      BIT STRING (SIZE (10−n))
}
-- ASN1STOP In Table 9, dlcc-BlockConfiguration is comprised of n bits ($1 \leq n \leq 10$), and can include information indicating whether initial access is permitted to the LTE-A user equipment. As the case may be, dlcc-BlockConfiguration may indicate whether initial access is permitted to the LTE user equipment, or may indicate whether initial access is permitted to both the LTE user equipment/LTE-A user equipment.

If the PBCH signal is transmitted through all CCs, information on the LTE-A non-access CC of the PBCH signal may relate to CC to which the corresponding PBCH signal is transmitted. In this case, the information on the LTE-A non-access CC can be represented by one bit. On the other hand, if the PBCH signal is transmitted through a part of CCs, the information on the LTE-A non-access CC of the PBCH signal may relate to other CC as well as CC to which the corresponding PBCH signal is transmitted. In this case, the information on the LTE-A non-access CC can be represented by a bit stream or bit map type. In case of the bit map, each bit can represent permission on not of access to the corresponding CC. Also, since the reserved field of the PBCH is enough 10 bits, it may also represent information (for example, information on LTE access CC) indicating whether initial access is permitted to the LTE user equipment. In this case, the information on LTE access CC can be represented by one or more bits or bit maps corresponding to the respective CCs.

In accordance with another method, the LTE-A user equipment may be notified, through system information, information on CC to which initial access of the LTE-A user equipment is not permitted. In this case, the information on the CC to which initial access of the LTE-A user equipment is not permitted can include a list of CC to which initial access of the LTE-A user equipment is not permitted in the same cell and/or different cells. In the current LTE system, a black list of a series of cell IDs is set up to prevent measurement of neighboring cells from being reported, whereby the corresponding cell ID can be ignored even though it is detected. Table 10 and Table 11 illustrate methods for setting up a black list of intra frequency measurement and inter frequency measurement by using SystemInformationBlockType4 and SystemInformationBlockType5, respectively.

TABLE 10

SystemInformationBlockType4 information element

```
-- ASN1START
SystemInformationBlockType4 ::= SEQUENCE {
    servingFreqCellReselectionInfo    SEQUENCE {
        s-NonIntraSearch         INTEGER (-60..-28)           OPTIONAL,
        threshServingLow              INTEGER (-60..-28),
        cellReselectionPriority  INTEGER (0..7)               OPTIONAL
    },
    intraFreqNeighbouringCellList    SEQUENCE (SIZE(1..maxCellIntra)) OF SEQUENCE {
        physicalCellIdentity          PhysicalCellIdentity,
        q-OffsetCell                  INTEGER (-15..15)
    }   OPTIONAL,
    intraFreqBlacklistedCellList    SEQUENCE (SIZE(1..maxCellBlack)) OF SEQUENCE {
        physicalCellIdentity          PhysicalCellIdentity
    }   OPTIONAL,
    ...
}
-- ASN1STOP
```

SystemInformationBlockType4 information element (IE) includes information on intra-frequency neighboring cells related to serving frequency and cell re-selection. In Table 10, intraFreqBlacklistedCellList represents a black list of physical cell IDs of neighboring cells of which measurement report is blocked.

TABLE 11

SystemInformationBlockType5 information element

```
-- ASN1START
SystemInformationBlockType5 ::= SEQUENCE {
    interFreqCarrierFreqList   SEQUENCE (SIZE(1..maxFreq)) OF SEQUENCE {
        eutra-CarrierFreq           EUTRA-DL-CarrierFreq,
        threshX-High                INTEGER (-60..-28),
        threshX-Low                 INTEGER (-60..-28),
        measurementBandwidth        MeasurementBandwidth,
        cellReselectionPriority     INTEGER (0..7)            OPTIONAL
        q-OffsetFreq                INTEGER (-15..15)         DEFAULT 0,
        interFreqNeighbouringCellList   SEQUENCE(SIZE(1..maxCellInter)) OF SEQUENCE{
            physicalCellIdentity        PhysicalCellIdentity,
            q-OffsetCell                INTEGER (-15..15)
        } OPTIONAL,
        interFreqBlacklistedCellList SEQUENCE(SIZE(1..maxCellBlack)) OF SEQUENCE {
            physicalCellIdentity        PhysicalCellIdentity
        } OPTIONAL
    },
    ...
}
-- ASN1STOP
```

SystemInformationBlockType4 information element (IE) includes information on inter-frequency neighboring cells related to other E-UTRA frequency and cell re-selection. In Table 11, interFreqBlacklistedCellist represents a black list of physical cell IDs of neighboring cells of which measurement report is blocked.

In the LTE-A system, cell-specific RRC parameters for LTE-A user equipments can be defined to block access (or search) of the LTE-A user equipments to a specific DL CC through initial cell search or neighboring cell measurement. In the present invention, methods for setting up RRC parameters of "intraFreqBlacklistedCellList" and "interFreqBlacklistedCellList" defined in the LTE system are defined in a broader range.

[Method 1]

A physical cell ID of which block is required and CC index are simultaneously defined in the RRC parameters. In more detail, "intraFreqBlacklistedCellCarrierList" and/or "interFreqBlacklistedCellCarrierList" can be defined as cell-specific system information RRC parameters defined in the LTE system as illustrated in Table 12 and Table 13.

TABLE 12

SystemInformationBlockTypeX information element

```
-- ASN1START
SystemInformationBlockTypeX ::= SEQUENCE {
    servingFreqCellReselectionInfo    SEQUENCE {
        s-NonIntraSearch          INTEGER (-60..-28)           OPTIONAL,
        threshServingLow                  INTEGER (-60..-28),
        cellReselectionPriority   INTEGER (0..7)               OPTIONAL
    },
    intraFreqNeighbouringCellList    SEQUENCE (SIZE(1..maxCellIntra)) OF SEQUENCE {
```

TABLE 12-continued

SystemInformationBlockTypeX information element

```
        physicalCellIdentity              PhysicalCellIdentity,
        q-OffsetCell                      INTEGER (-15..15)
    }   OPTIONAL,
    intraFreqBlacklistedCellList    SEQUENCE (SIZE(1..maxCellBlack)) OF SEQUENCE {
        physicalCellIdentity              PhysicalCellIdentity,
        CarrierOffset                     DownlinkComponentCarrierIndex
    }   (Mandated),
    ...
}
-- ASN1STOP
```

SystemInformationBlockTypeX information element (IE) includes information on intra-frequency neighboring cells related to serving frequency and cell re-selection. In Table 12, intraFreqBlacklistedCellList represents a black list of physical cell IDs of neighboring cells of which measurement report is blocked. CarrierOffset represents a list of CC indexes of DL CCs, of which detection is desired to be blocked during measurement or initial cell search. The CC indexes include different CCs in the same cell and/or CCs of different cells.

ment report is blocked. CarrierOffset represents a list of CC indexes of DL CCs, of which detection is desired to be blocked during measurement or initial cell search. The CC indexes include different CCs in the same cell and/or CCs of different cells.

[Method 2]

DL CC indexes to be blocked can be designated by defining a separate RRC parameter without using RRC parameters

TABLE 13

SystemInformationBlockTypeY information element

```
-- ASN1START
SystemInformationBlockTypeY ::= SEQUENCE {
    interFreqCarrierFreqList    SEQUENCE (SIZE(1..maxFreq)) OF SEQUENCE {
        eutra-CarrierFreq             EUTRA-DL-CarrierFreq,
        threshX-High                  INTEGER (-60..-28),
        threshX-Low                   INTEGER (-60..-28),
        measurementBandwidth          MeasurementBandwidth,
        cellReselectionPriority       INTEGER (0..7)                       OPTIONAL
        q-OffsetFreq                  INTEGER (-15..15)                    DEFAULT 0,
        interFreqNeighbouringCellList    SEQUENCE(SIZE(1..maxCellInter)) OF SEQUENCE{
            physicalCellIdentity          PhysicalCellIdentity,
            q-OffsetCell                  INTEGER (-15..15)
        }   OPTIONAL,
        interFreqBlacklistedCellList SEQUENCE(SIZE(1..maxCellBlack)) OF SEQUENCE {
            physicalCellIdentity      PhysicalCellIdentity
            CarrierOffset                     DownlinkComponentCarrierIndex
        }   (Mandated)
    },
    ...
}
-- ASN1STOP
```

SystemInformationBlockTypeY information element (IE) includes information on inter-frequency neighboring cells related to other E-UTRA frequency and cell re-selection. In Table 13, interFreqBlacklistedCellList represents a black list of physical cell IDs of neighboring cells of which measuredefined in the LTE system. For example, "intraFreqBlacklistedCarrierList" and/or "interFreqBlacklistedCarrierList" can additionally be defined as cell-specific system information RRC parameters for the LTE-A user equipment as illustrated in Table 14 and Table 15.

TABLE 14

SystemInformationBlockTypeX information element

```
-- ASN1START
SystemInformationBlockTypeX ::= SEQUENCE {
    servingFreqCellReselectionInfo   SEQUENCE {
        s-NonIntraSearch              INTEGER (-60..-28)            OPTIONAL,
        threshServingLow              INTEGER (-60..-28),
        cellReselectionPriority       INTEGER (0..7)                OPTIONAL
    },
    intraFreqNeighbouringCellList    SEQUENCE (SIZE(1..maxCellIntra)) OF SEQUENCE {
        physicalCellIdentity              PhysicalCellIdentity,
        q-OffsetCell                      INTEGER (-15..15)
    }   OPTIONAL,
    intraFreqBlacklistedCellList    SEQUENCE (SIZE(1..maxCellBlack)) OF SEQUENCE {
        physicalCellIdentity              PhysicalCellIdentity,
```

TABLE 14-continued

SystemInformationBlockTypeX information element

```
    }   (Mandated),
    intraFreqBlacklistedCarrierList SEQUENCE(SIZE(1..maxCarrierBlack))OF SEQUENCE{
        CarrierOffset           DownlinkComponentCarrierIndex
    }   (Mandated),
    ...
}
-- ASN1STOP
```

SystemInformationBlockTypeX information element (IE) includes information on intra-frequency neighboring cells related to serving frequency and cell re-selection. In Table 14, intraFreqBlacklistedCellist represents a black list of physical cell IDs of neighboring cells of which measurement report is blocked. CarrierOffset represents a list of CC indexes of DL CCs, of which detection is desired to be blocked during measurement or initial cell search. The CC indexes include different CCs in the same cell and/or CCs of different cells.

TABLE 15

SystemInformationBlockTypeY information element

```
-- ASN1START
SystemInformationBlockTypeY ::= SEQUENCE {
    interFreqCarrierFreqList    SEQUENCE (SIZE(1..maxFreq)) OF SEQUENCE {
        eutra-CarrierFreq           EUTRA-DL-CarrierFreq,
        threshX-High                INTEGER (-60..-28),
        threshX-Low                 INTEGER (-60..-28),
        measurementBandwidth        MeasurementBandwidth,
        cellReselectionPriority     INTEGER (0..7)                  OPTIONAL
        q-OffsetFreq                INTEGER (-15..15)               DEFAULT 0,
        interFreqNeighbouringCellList    SEQUENCE(SIZE(1..maxCellInter)) OF SEQUENCE{
            physicalCellIdentity        PhysicalCellIdentity,
            q-OffsetCell                INTEGER (-15..15)
        } OPTIONAL,
        interFreqBlacklistedCellList SEQUENCE(SIZE(1..maxCellBlack)) OF SEQUENCE {
            physicalCellIdentity        PhysicalCellIdentity
        } (Mandated)
        interFreqBlacklistedCarrierList SEQUENCE(SIZE(1..maxCarrierBlack)) OF SEQUENCE{
            CarrierOffset   DownlinkComponentCarrierIndex
        } (Mandated)
    },
    ...
}
-- ASN1STOP
```

SystemInformationBlockTypeY information element (IE) includes information on inter-frequency neighboring cells related to other E-UTRA frequency and cell re-selection. In Table 15, interFreqBlacklistedCellist represents a black list of physical cell IDs of neighboring cells of which measurement report is blocked. CarrierOffset represents a list of CC indexes of DL CCs, of which detection is desired to be blocked during measurement or initial cell search. The CC indexes include different CCs in the same cell and/or CCs of different cells.

[Method 3]

DL CC indexes to be blocked can be designated by defining a separate SystemInformationBlockType. For example, "intraFreqBlacklistedCarrierList" and/or "interFreqBlacklistedCarrierList" can be defined in the separate SystemInformationBlockType as cell-specific system information RRC parameters for the LTE-A user equipment as illustrated in Table 16 and Table 17. At this time, other RRC parameters can be defined together.

TABLE 16

System InformationBlockTypeX information element

```
-- ASN1START
SystemInformationBlockTypeX ::= SEQUENCE {
    ...
    intraFreqBlacklistedCarrierList
```

TABLE 16-continued

System InformationBlockTypeX information element

```
    SEQUENCE(SIZE(1..maxCarrierBlack))OF SEQUENCE{
        CarrierOffset           DownlinkComponentCarrierIndex
    }   (Mandated),
    ...
}
-- ASN1STOP
```

SystemInformationBlockTypeX information element (IE) includes information on DL CC during frequency aggregation. CarrierOffset represents a list of CC indexes of DL CCs, of which detection is desired to be blocked during measurement or initial cell search. The CC indexes include different CCs in the same cell and/or CCs of different cells. The information element may further include frequency aggregation RRC parameter and/or cell-specific RRC parameter.

TABLE 17

SystemInformationBlockTypeY information element

```
-- ASN1START
SystemInformationBlockTypeY ::= SEQUENCE {
    ...
    interFreqBlacklistedCarrierList
    SEQUENCE(SIZE(1..maxCarrierBlack)) OF SEQUENCE{
        CarrierOffset    DownlinkComponentCarrierIndex
    }           (Mandated)
    },
    ...
}
-- ASN1STOP
```

SystemInformationBlockTypeY information element (IE) includes information on DL CC during frequency aggregation. CarrierOffset represents a list of CC indexes of DL CCs, of which detection is desired to be blocked during measurement or initial cell search. The CC indexes include different CCs in the same cell and/or CCs of different cells. The information element may further include frequency aggregation RRC parameter and/or cell-specific RRC parameter.

Figure 17:
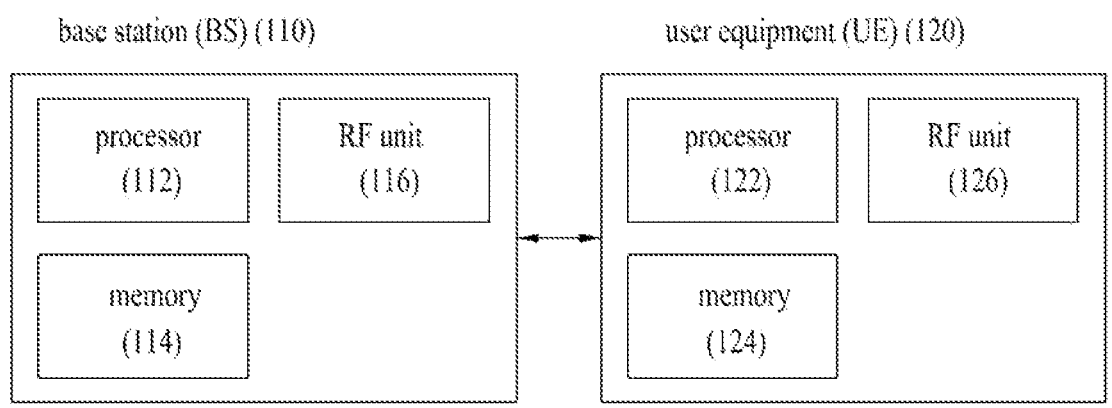
FIG. 17 is a diagram illustrating a base station and a user equipment, which can be applied to one embodiment of the present invention.

FIG. 17 is a diagram illustrating a base station and a user equipment, which can be applied to one embodiment of the present invention.

Referring to FIG. 17, a wireless communication system includes a base station (BS) 110 and a user equipment (UE) 120. In the downlink, the transmitter is a part of the base station 110, and the receiver is a part of the user equipment 120. In the uplink, the transmitter is a part of the user equipment 120, and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS), terminal and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method for setting up a carrier in a frequency aggregation system and an apparatus for the same.

The invention claimed is:

1. A method for configuring a component carrier at a base station in a wireless communication system supporting carrier aggregation, the method comprising:
  configuring a downlink component carrier among a plurality of component carriers as a non-backward compatible component carrier,
  wherein an initial access for the non-backward compatible component carrier by an evolved user equipment (UE) is permitted and an initial access for the non-backward compatible component carrier by an legacy UE is not permitted;
  transmitting a synchronization channel and a broadcast channel to at least one UE, via the non-backward compatible downlink component carrier,
  where the synchronization channel includes a primary synchronization channel and a secondary synchronization channel;
  receiving an uplink signal from the evolved UE via an uplink component carrier linked to the non-backward compatible component carrier; and receiving an uplink signal from the legacy UE via an uplink component carrier linked to a backward compatible downlink component carrier where the initial access by the legacy UE is permitted, wherein the broadcast channel transmitted via the non-backward compatible component carrier is modified from a broadcast channel transmitted via the backward compatible downlink component carrier, and wherein, for the non-backward compatible downlink component carrier, an orthogonal frequency division multiplexing (OFDM) symbol for the primary synchronization channel is followed by an OFDM symbol for the secondary synchronization channel in a subframe, to restrict the initial access for the non-backward compatible downlink component carrier by the legacy UE.

2. The method of claim 1, wherein the transmitting the synchronization channel and the broadcast channel comprises scrambling segment 1 on the basis of segment 2 in a secondary synchronization channel into which the segment 1 and the segment 2 are mapped.

3. The method of claim 1, wherein the initial access permission is applied by modifying a phase of a signal transmitted through the synchronization channel.

4. The method of claim 1, wherein the transmitting the synchronization channel and the broadcast channel comprises modifying a location in a time domain of the broadcast channel.

5. The method of claim 1, wherein the transmitting the synchronization channel and the broadcast channel comprises varying scrambling applied to a message of the broadcast channel.

6. The method of claim 1, wherein the transmitting the synchronization channel and the broadcast channel comprises varying a CRC mask applied to cyclic redundancy check (CRC) of the broadcast channel.

7. A base station configured to perform a method for configuring a component carrier and to support carrier aggregation in a wireless communication system, the base station comprising:

a radio frequency (RF) unit configured to transmit and receive a radio signal to and from a user equipment (UE);

a memory for storing information transmitted to and received from the UE and a parameter required for an operation of the base station; and a processor connected with the RF unit and the memory and configured to control the RF unit and the memory for the operation of the base station, wherein the processor is adapted to:

configure a downlink component carrier among a plurality of component carriers as a non-backward compatible component carrier, wherein an initial access for the non-backward compatible component carrier by an evolved user equipment (UE) is permitted and an initial access for the non-backward compatible component carrier by an legacy UE is not permitted, transmit a synchronization channel and a broadcast channel to at least one UE, via the non-backward compatible downlink component carrier, where the synchronization channel includes a primary synchronization channel and a secondary synchronization channel, receive an uplink signal from the evolved UE via an uplink component carrier linked to the non-backward compatible component carrier, and receive an uplink signal from the legacy UE via an uplink component carrier linked to a backward compatible downlink component carrier where the initial access by the legacy UE is permitted, wherein the broadcast channel transmitted via the non-backward compatible component carrier is modified from a broadcast channel transmitted via the backward compatible downlink component carrier, and wherein, for the non-backward compatible downlink component carrier, an orthogonal frequency division multiplexing (OFDM) symbol for the primary synchronization channel is followed by an OFDM symbol for the secondary synchronization channel in a subframe, to restrict the initial access for the non-backward compatible downlink component carrier by the legacy UE.

* * * * *